US011656762B2

(12) United States Patent
Becker et al.

(10) Patent No.: US 11,656,762 B2
(45) Date of Patent: May 23, 2023

(54) VIRTUAL KEYBOARD ENGAGEMENT

(71) Applicant: Microsoft Technology Licensing, LLC, Redmond, WA (US)

(72) Inventors: Christopher M. Becker, Bellevue, WA (US); Nazeeh A. Eldirghami, Redmond, WA (US); Kevin W. Barnes, Seattle, WA (US); Julia Schwarz, Redmond, WA (US); Eric Carter, Newcastle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/308,476

(22) Filed: May 5, 2021

(65) Prior Publication Data

US 2021/0255767 A1    Aug. 19, 2021

Related U.S. Application Data

(63) Continuation of application No. 16/509,267, filed on Jul. 11, 2019, now Pat. No. 11,029,845.

(51) Int. Cl.
*G06F 3/01* (2006.01)
*G06F 3/04886* (2022.01)

(52) U.S. Cl.
CPC .......... *G06F 3/04886* (2013.01); *G06F 3/011* (2013.01)

(58) Field of Classification Search
CPC ........ G06F 3/0484; G06F 3/0482; G06F 8/38; G06F 3/04886; G06F 3/011; G06F 3/017; G06N 20/00
See application file for complete search history.

(56) References Cited

U.S. PATENT DOCUMENTS

| | | | |
|---|---|---|---|
| 2014/0078176 A1* | 3/2014 | Kim | G06F 3/011 345/633 |
| 2014/0359540 A1* | 12/2014 | Kelsey | G06F 3/017 715/863 |
| 2015/0268814 A1* | 9/2015 | Wang | G06F 3/0304 715/773 |
| 2016/0282956 A1* | 9/2016 | Ouyang | G06F 3/04886 |
| 2016/0299685 A1* | 10/2016 | Zhai | G06F 3/04886 |
| 2017/0003876 A1* | 1/2017 | Marsden | G06F 3/0231 |
| 2017/0293402 A1* | 10/2017 | Morris | G06F 3/0482 |
| 2017/0329515 A1* | 11/2017 | Clement | G06F 3/04815 |
| 2018/0004305 A1* | 1/2018 | Moseley | G06F 3/0447 |
| 2019/0034057 A1* | 1/2019 | Rudchenko | G06F 3/04886 |

\* cited by examiner

*Primary Examiner* — Beau D Spratt
(74) *Attorney, Agent, or Firm* — Rainier Patents, P.S.

(57) ABSTRACT

The discussion relates to virtual keyboard engagement. One example can define key volumes relating to keys of a virtual keyboard and detect finger movement of a user through individual key volumes. The example can detect parameter changes associated with detected finger movement through individual key volumes and build potential key sequences from detected parameter changes.

20 Claims, 24 Drawing Sheets

SCENARIO 100B

VIRTUAL KEYBOARD ENGAGEMENT

BACKGROUND

For the last several decades, physical keyboards have been one of the most ubiquitous devices for users to interact with a computing device. Often physical keyboards are positioned in front of a display. Users tend to lightly rest their hands on the keyboard. Landmark structures, such as ridges on the 'f' and 'j' keys can allow the user to know the relative position of their hands without even looking at the keyboard. With some practice, users can physically engage individual keys of the keyboard to quickly select characters represented by the keys. Users can comfortably rest their hands on the keys and select content very quickly (e.g., accurately engaging hundreds of keys per minute). Engaging a physical keyboard provides haptic feedback when keys are activated. Overall, physical keyboards provide a relatively fast input mechanism that satisfies most users.

As new virtual reality and/or augmented reality paradigms evolve, the keyboard concept has been carried over as a virtual keyboard, which is intended to mimic the familiar form factor. Commonly, virtual keyboards are projected in front of the user. However, characteristics that contributed to the success of physical keyboards are lacking in virtual keyboards. For instance, the user cannot rest their hands on a virtual keyboard, there are no landmarks to orient the user's hands, and/or there is no haptic feedback to indicate a key has been activated. Alternative user engagement options have been tried, such as the user verbally calling out the characters on individual keys as a way to select those keys. These options have proven slow and difficult. The present concepts address these and other difficulties.

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. In some cases, parentheticals are utilized after a reference number to distinguish like elements. Use of the reference number without the associated parenthetical is generic to the element. Further, the left-most numeral of each reference number conveys the figure and associated discussion where the reference number is first introduced.

DETAILED DESCRIPTION

Figure 1A:
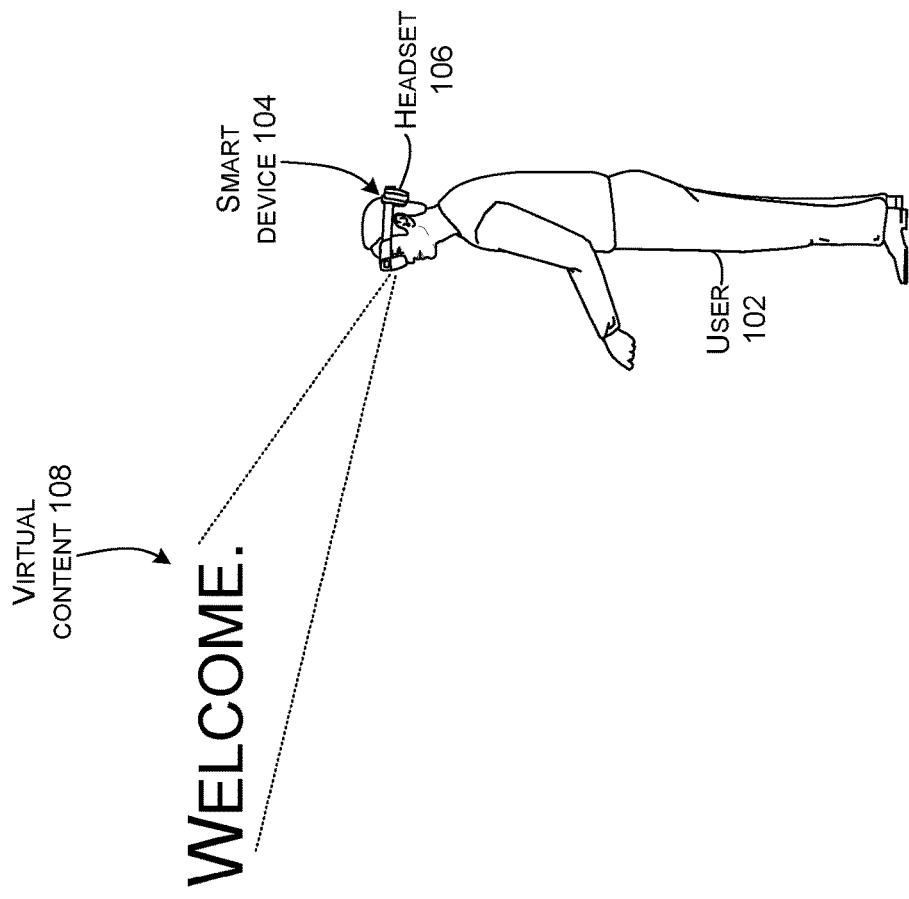
FIGS. 1A-3 show example dynamic virtual keyboard scenarios in accordance with some implementations of the present concepts.
Figure 1A:
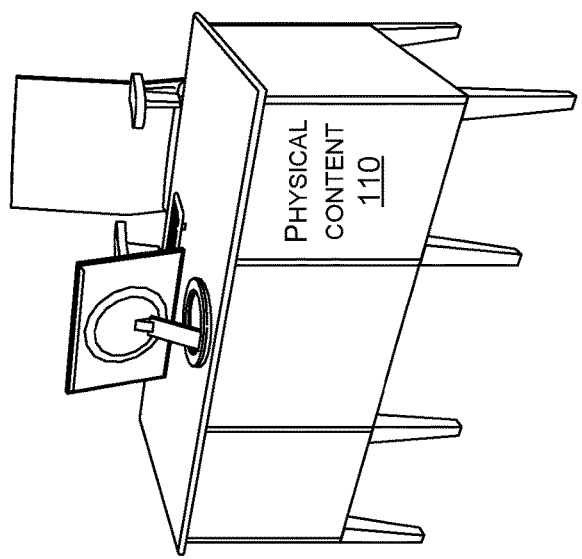

Over the last several decades physical keyboards became a dominant avenue for users to interact with a device. The user can rest his/her hands on the keyboard and quickly engage individual keys to achieve desired input. A simulation of the physical keyboard can be generated in virtual/augmented reality scenarios (e.g., a virtual keyboard). For instance, a 2D simulation of a keyboard can be superimposed on a scene that the user is viewing. However, interacting with a virtual keyboard tends not to parallel interacting with a physical keyboard. For instance, the user cannot rest his/her hands on a virtual keyboard projected in front of them. Similarly, there are not tactile landmarks on a virtual keyboard that allow the user to know the relationship between his/her hands and the virtual keyboard. Thus, the 'typing' speed tends to be slow and the user attempts to 'hit' one key in a dedicated discrete gesture. Once sure that the correct key is activated, the user can make another dedicated discrete gesture toward the next key and so on.

The present implementations can allow the user to readily and quickly interact with the virtual keys and accurately determine which keys the user intended to select. Toward this end, some implementations can allow the user to trace a path over the virtual keys in a fluid (e.g., continuous) motion and can track one or more parameters associated with the user interaction. The parameters can be utilized to calculate a probability that the user intended to select an individual key and/or sequence of keys (e.g., words or phrases). This can provide a faster and more satisfying user experience.

From another perspective, the present concepts can enable tracking a path of a user action in 3D space. The path can be correlated to volumes assigned to individual keys of a virtual keyboard displayed in the 3D space. User intent to select individual keys can be determined based at least in part on multiple parameters associated with the path. To enhance the user experience, user input that is associated with the user intent can be automatically generated on behalf of the user.

FIGS. 1A-1L collectively show example scenarios 100 where example virtual keyboard engagement concepts can be employed. Scenario 100 relates to a user 102 engaging a smart device 104. In this case, the smart device is manifest as a headset 106. The headset can generate virtual content 108 that is visible to the user. In this example, the headset 106 can present the virtual content 108 so that the virtual content can be perceived by the user 102. In some cases, the user may only be able to see virtual content (e.g., a virtual reality scenario). In other cases, the virtual content may be visible along with physical content 110 of the scene (e.g., augmented reality scenario). (The physical content 110 is only illustrated in FIGS. 1A and 1B to avoid clutter on the remaining drawing pages).

In this example, the virtual content 108 is only visible to the user 102 and not to other users who may be in the scene. In other examples, the virtual content 108 may be visible to any user in the scene. For instance, the virtual content may be a two-dimensional or three-dimensional projection in the scene that is generated by another smart device (not shown here, but shown and discussed below relative to FIG. 4).

Figure 1B:
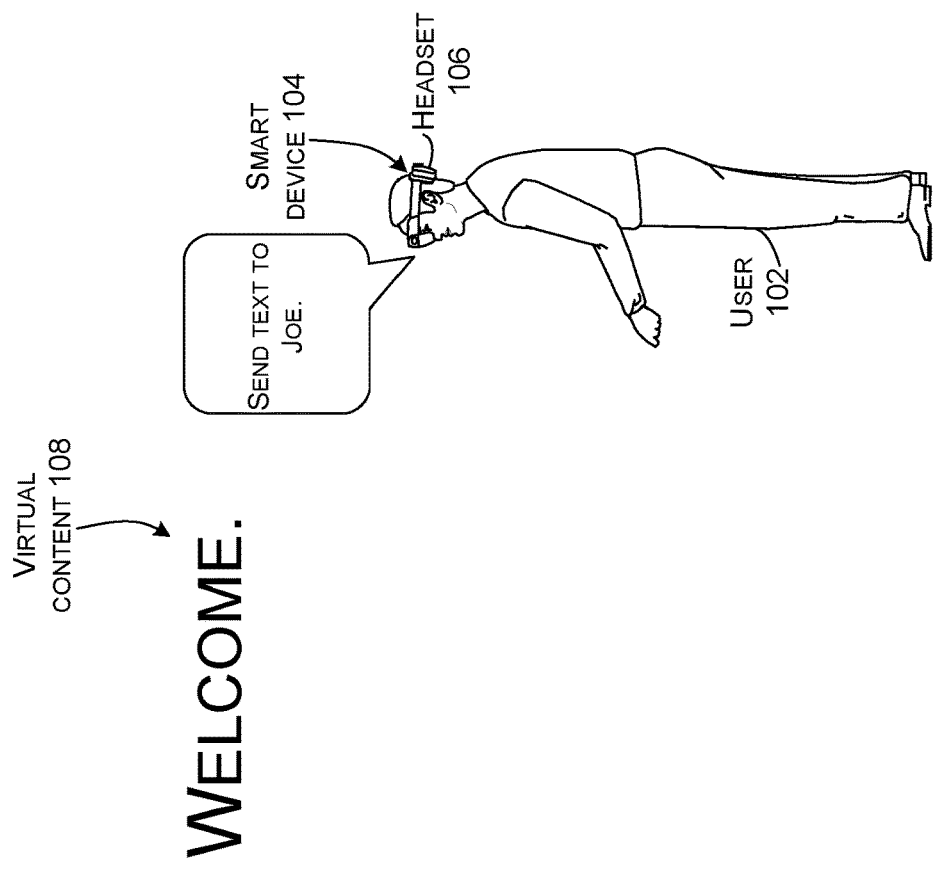
Figure 1B:
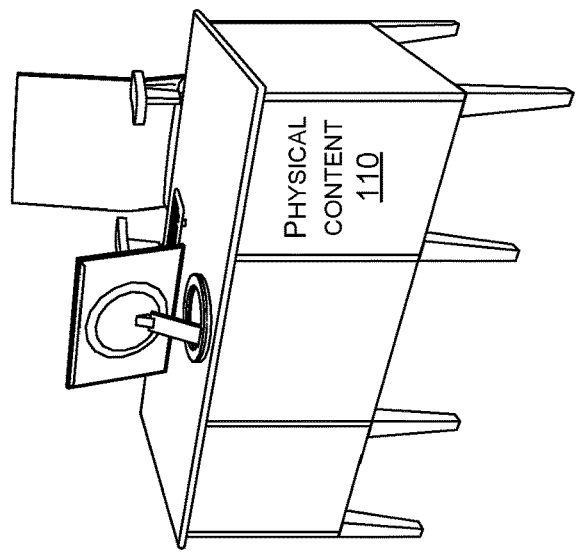

FIG. 1A shows the virtual content 108 as a 'welcome' graphical user interface (GUI) generated for the user 102 by the headset 106. FIG. 1B shows the user 102 interacting with the headset 106 by saying 'send text to Joe' in this example.

Figure 1C:
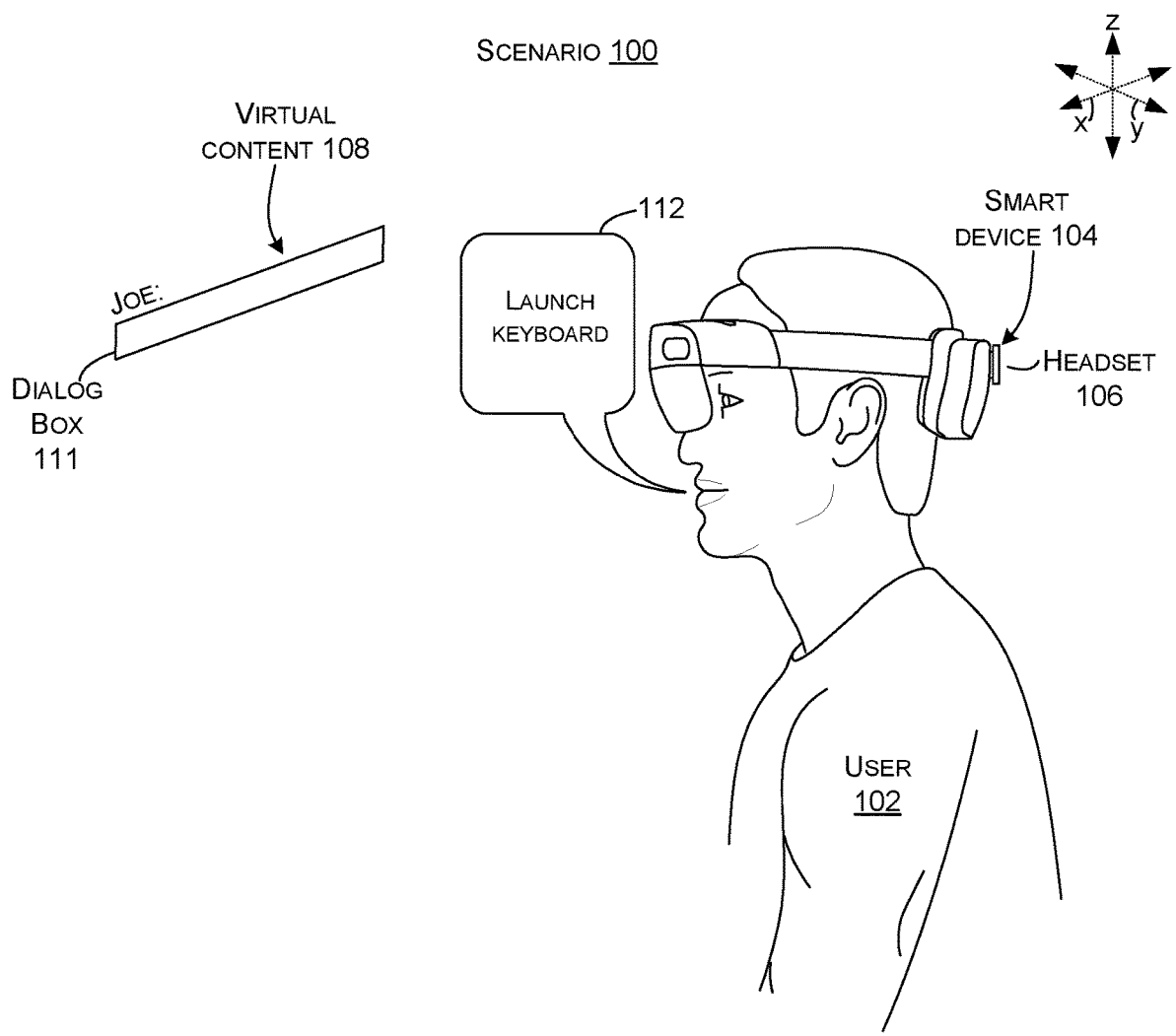

FIG. 1C shows virtual content 108 relating to a texting GUI generated response to the user action of FIG. 1B. In this case, the texting GUI includes a dialog box 111. For purposes of explanation, assume that the user wants to enter text via an input/command GUI, such as a virtual keyboard, and says a user command 'launch keyboard' at 112.

Figure 1D:
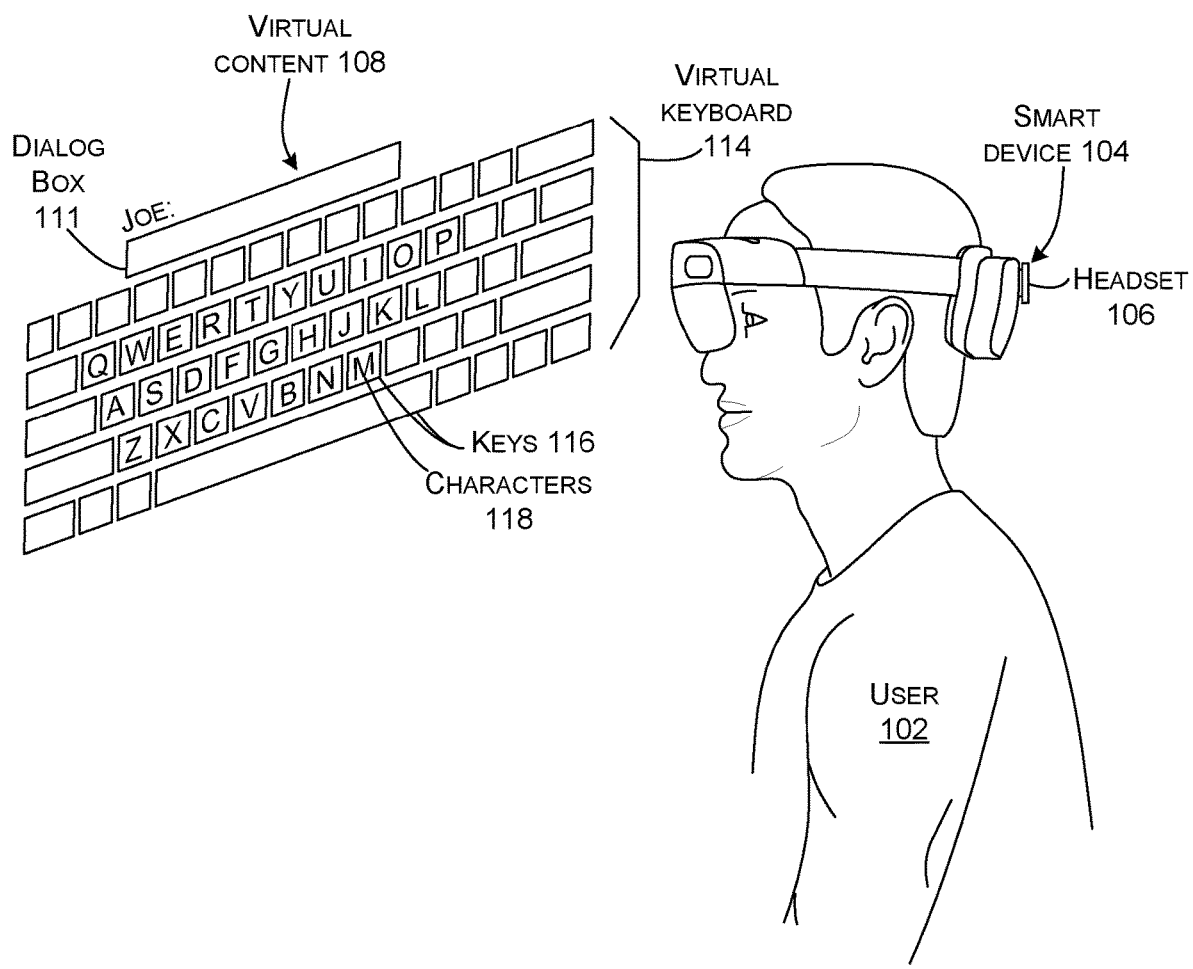

FIG. 1D shows a virtual keyboard 114 as presented to the user 102 by the headset 106. The virtual keyboard 114 can include virtual keys 116 relating to one or more characters 118 (not all of which are shown or designated with specificity to avoid clutter on the drawing page). In this case, only the letter characters are shown on the keys to simplify the drawings, but the present concepts can be applied to any and/or all keys. Note in some virtual keyboard configurations, some keys relate to a single character, such as the 'A' key, while other keys relate to multiple characters, such as the '2' and '@' key. The present concepts can offer disambiguation as to whether the user intended to select the '2' character or the '@' character. This aspect will be described below. Note also that any kind of virtual keyboard can be employed, such as one that mimics a calculator, a key pad, or other input/command GUI that tends to have multiple closely spaced keys, among others.

Figure 1E:
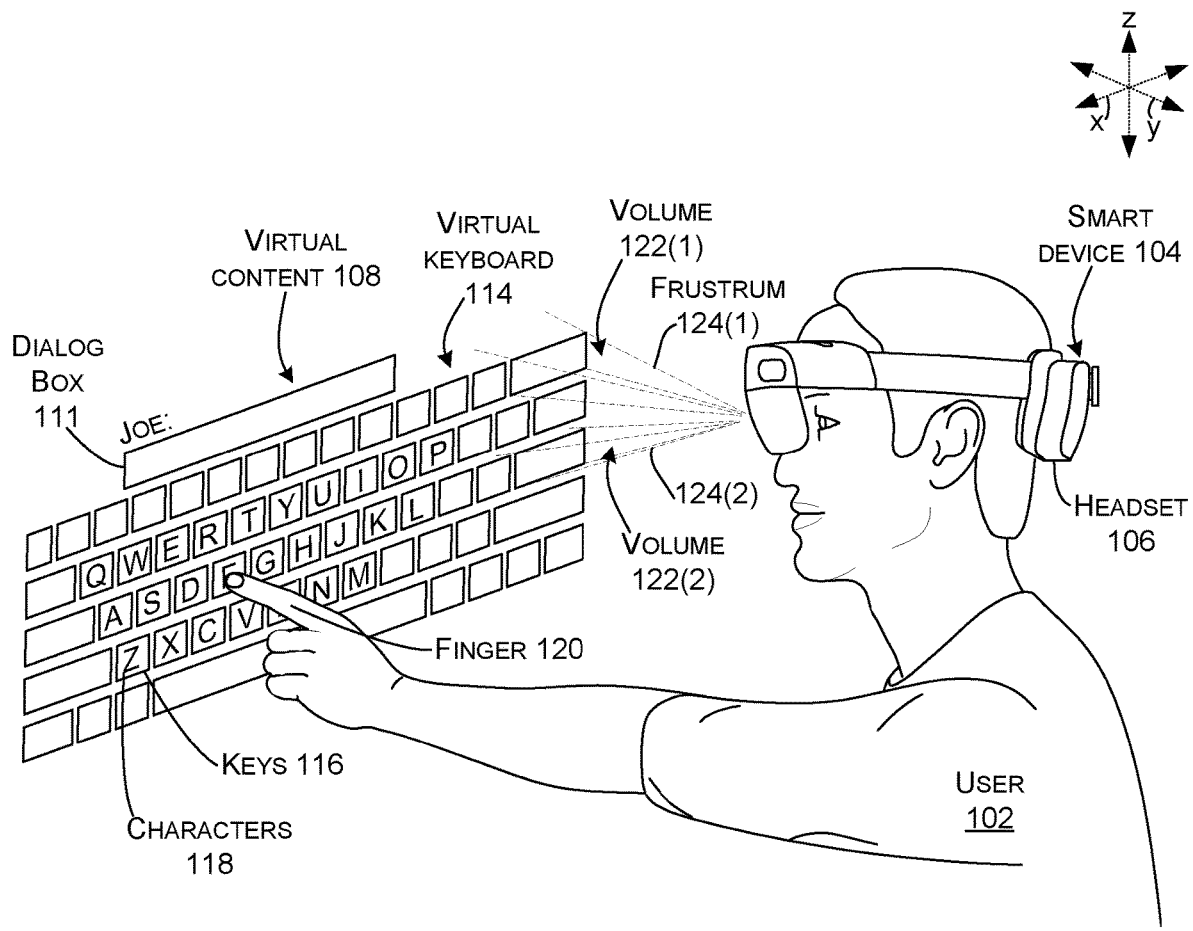

FIG. 1E shows the user 102 can engage the virtual keyboard 114 by mimicking typing on a physical keyboard. In this case, the user is employing a single finger 120 of one hand. In other cases, the user could employ multiple fingers—of one hand and/or both left and right hands. The user could alternatively use a pointer or some other hand held device (e.g., a six-axis virtual controller). However, as mentioned above, the experience is not the same in that the user cannot 'touch' a virtual keyboard in the same way that the user can touch a physical keyboard. Thus, the user may think he is engaging a key when in fact, the user's finger is not on the key, but is instead in front of or behind the key. As such, using touch (e.g., is the tip of the user's finger on the plane of a front surface of the key) as an indicator of user intent does not tend to produce accurate results and/or causes the user to be so deliberate that progress is very slow.

Figure 3:
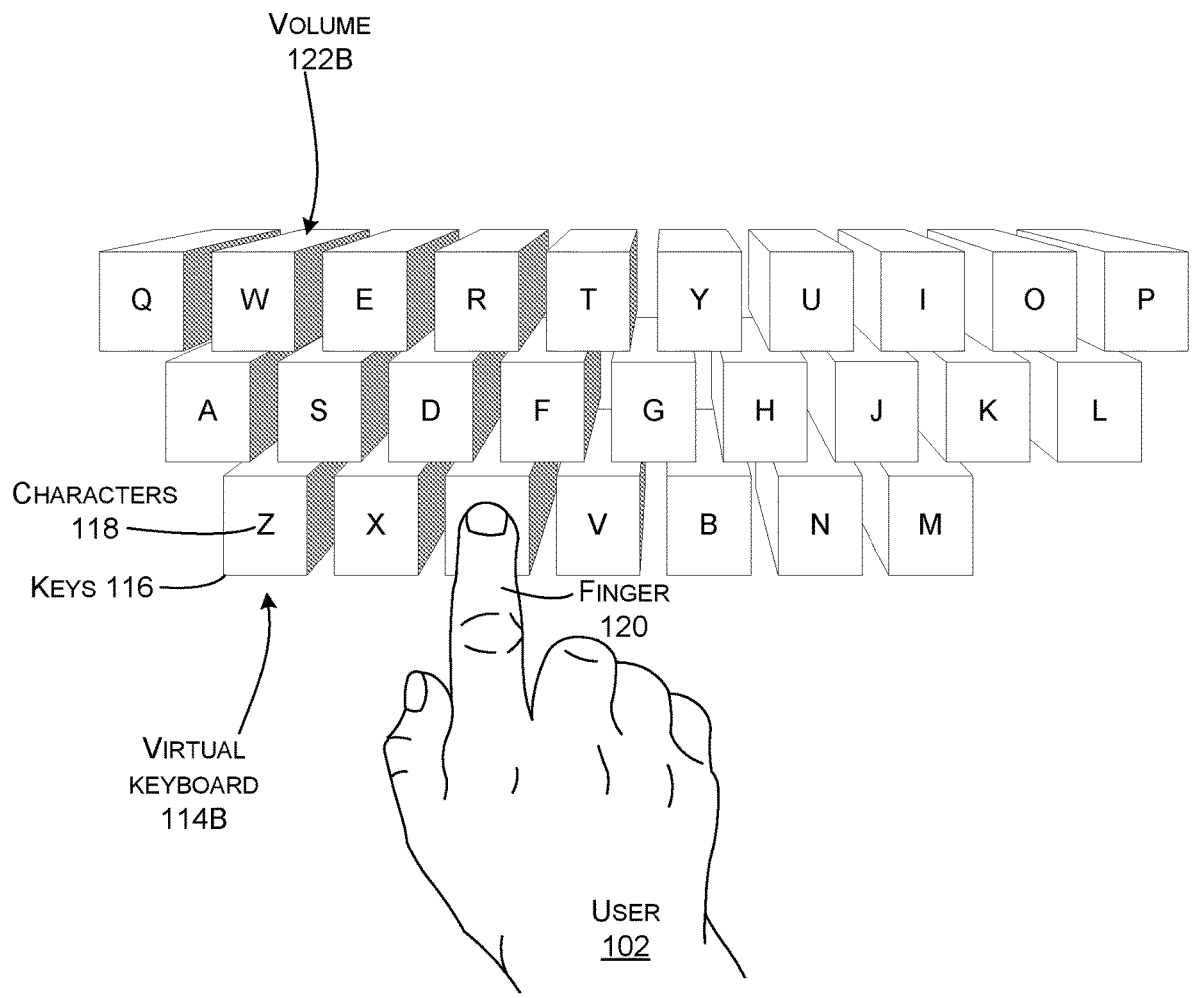

Instead of tracking user 'contact' with the keys 116, some implementations can associate each key 116 with a volume 122. (Only two volumes on the side of the virtual keyboard 114 are shown and labeled to avoid clutter on the drawing page). The presence of the user's finger 120 relative to the volume can be tracked as one or more of the parameters which are utilized to predict user intent. In this implementation, the volumes 122 can be defined as a frustrum 124 extending from the user's eyes and including the key 116 (e.g., being partially defined by the key). Other implementations can define the volumes 122 in different ways. One such example is shown relative to FIG. 3. In the illustrated implementation, the volumes 122 are utilized to determine user intent (e.g., is the user engaging the volume of a key), but the volumes are not visible to the user. In the implementation of FIG. 3, the volumes are visible to the user as 3D keys.

Several parameters can be tracked relating to a path of the user's finger 120 and the volumes 122. For instance, parameters may relate to direction of movement through the volume, change in direction, velocity, change in velocity, time in the volume, etc. Several parameters are discussed by way of example in the discussion that follows. Note that to avoid clutter on the drawing page the path is not shown on FIG. 1E, but is shown and designated relative to FIG. 1K.

Figure 1F:
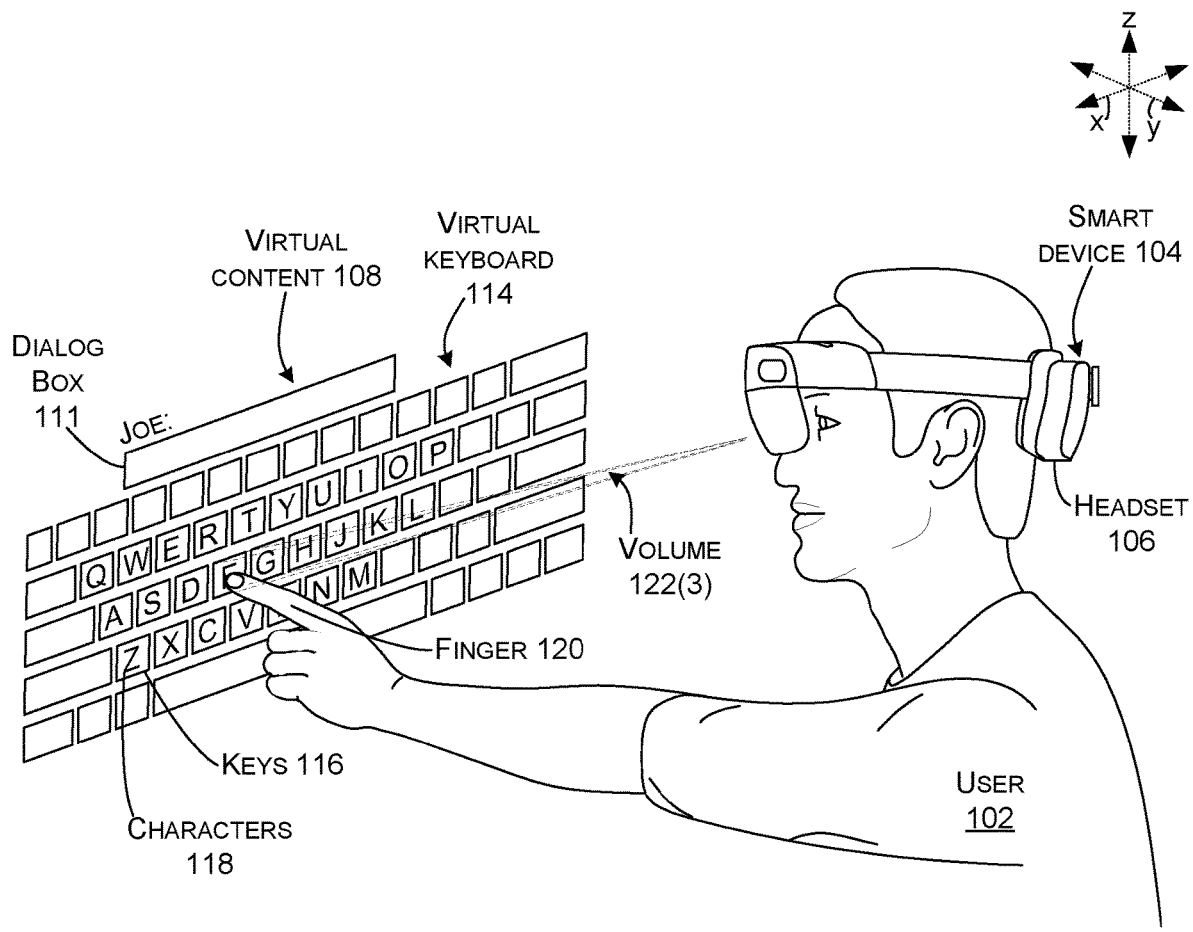

With respect to the example of FIG. 1E, assume for purposes of explanation that the user intends to type (e.g., enter) the word 'faces' in the dialog box 111. The user starts by addressing the 'F' key. The term 'addressing' is used here because the user may or may not actually 'contact' the 'F' key. FIG. 1F shows volume 122(3) associated with the 'F' key. The user's finger is in the volume 122(3).

Figure 1G:
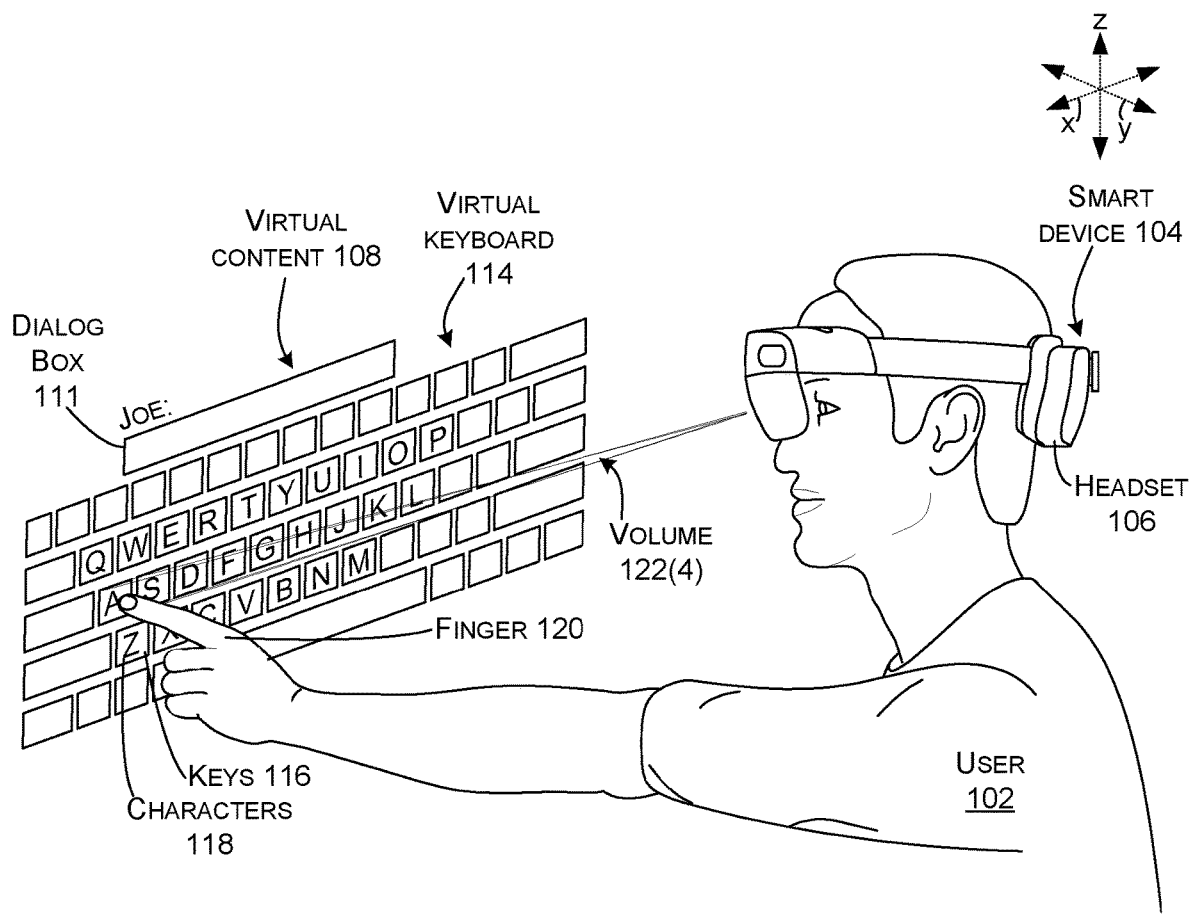
Figure 1H:
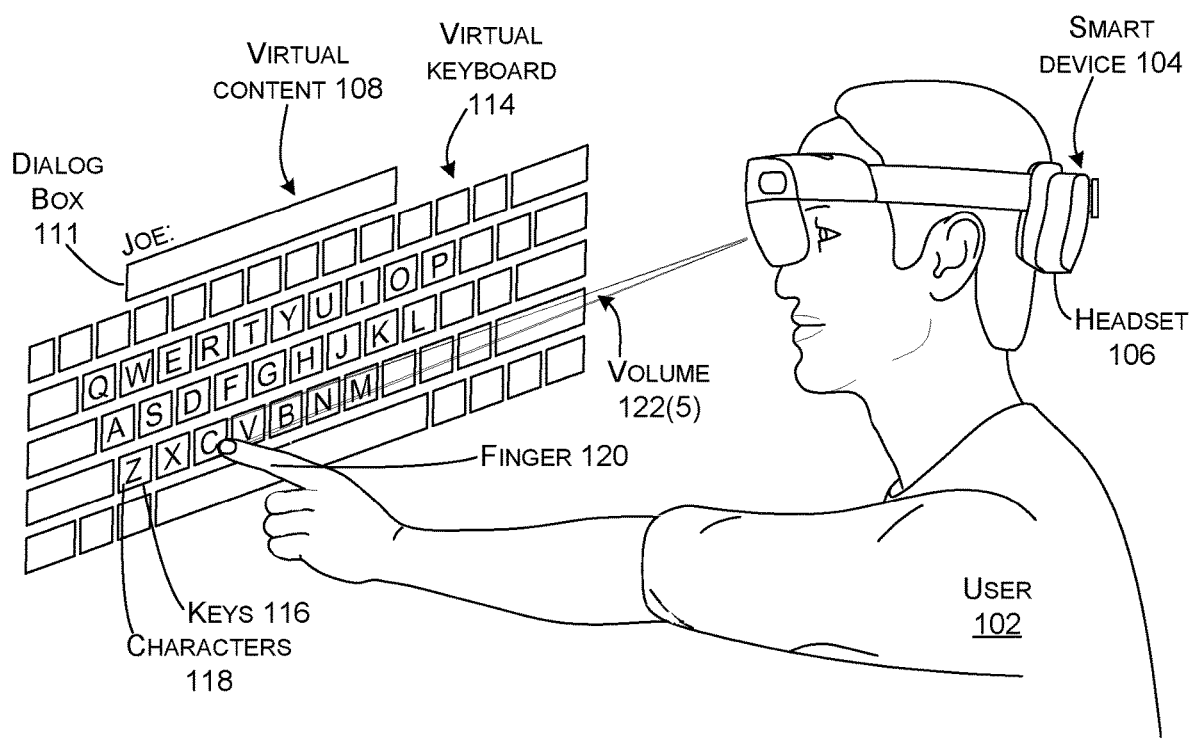
Figure 1I:
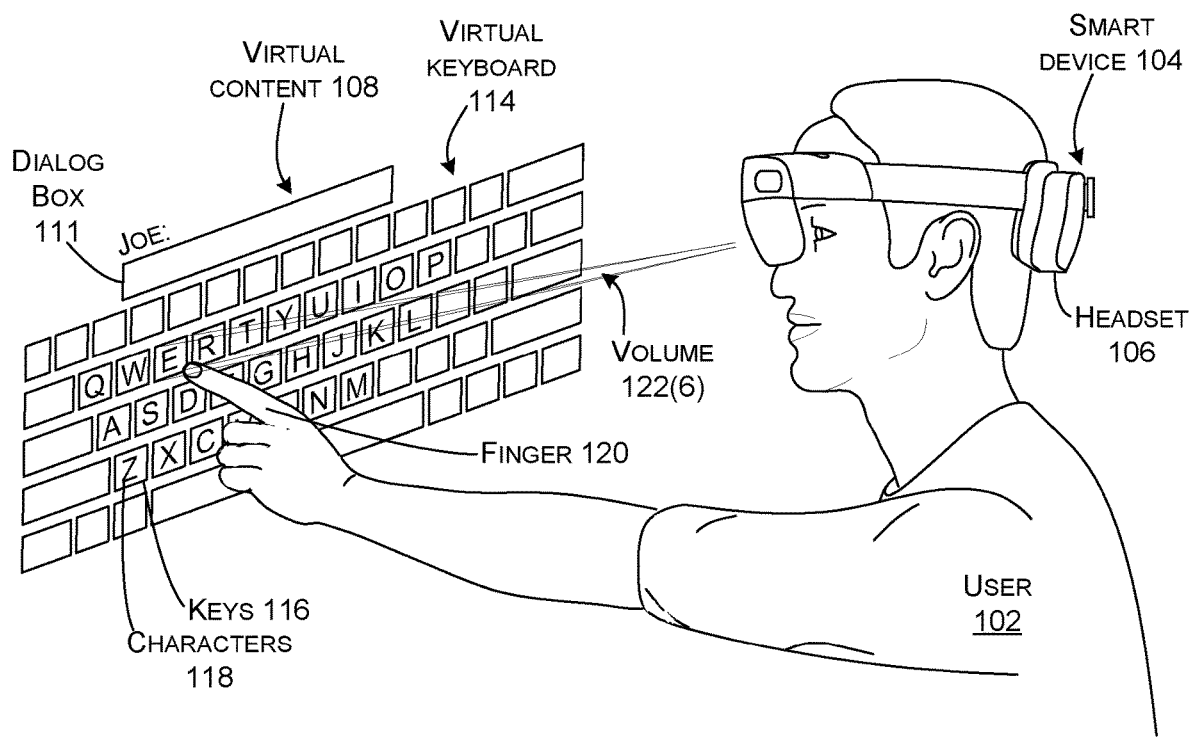
Figure 1J:
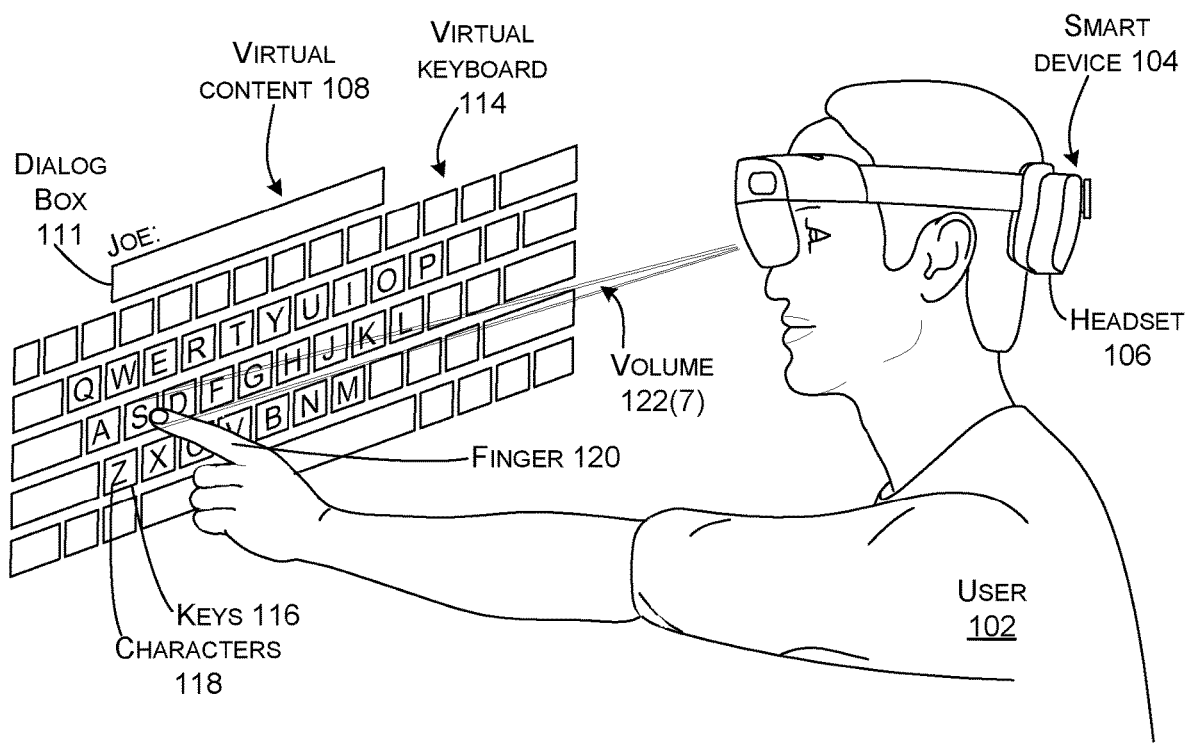

FIG. 1G shows the user's finger 120 has moved horizontally (e.g., in the x-reference direction) across intervening keys to the volume 122(4) associated with the 'A' key. FIG. 1H shows the user's finger 120 has moved down to the volume 122(5) associated with the 'C' key. FIG. 1I shows the user's finger 120 has moved up to the volume 122(6) associated with the 'E' key. FIG. 1J shows the user's finger 120 has moved down to the volume 122(7) associated with the 'S' key.

Figure 1K:
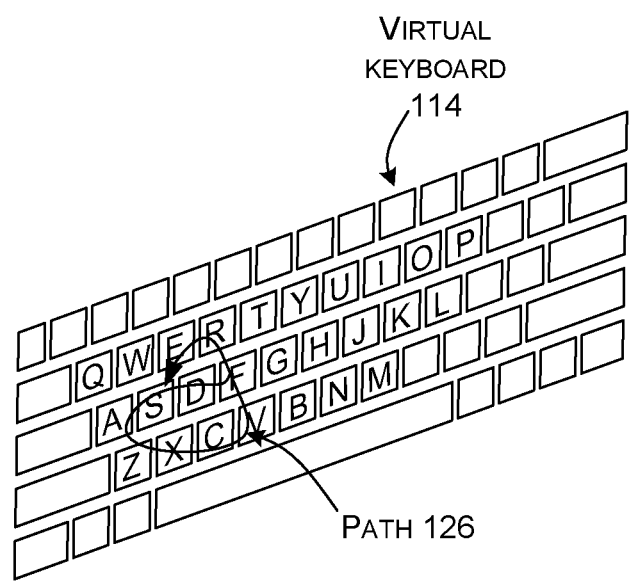

FIG. 1K shows a tracked path 126 of the user's finger through volumes 122 associated with individual keys 116. In this example, the characters associated with the keys of the path are 'F,' 'D,' 'S,' 'A,' 'Z,' 'X,' 'C,' 'V,' 'F,' 'R,' 'E,' and 'S.' Probabilities of the user intending to engage individual keys and hence characters could be weighted based at least in part upon further parameters associated with the path of the user's finger, such as dwell time and/or directional changes. For instance, the probability that the user intended to engage an individual key can be higher where the user's finger changed direction over the key than where the user's finger passed straight over the key. Similarly, the dwell time (e.g., the length of time) that the user's finger was in an individual key's volume can be considered. For instance, increased dwell time can correlate to an increased probability that the user intended to engage the key.

As mentioned above many different sets of parameters can be utilized to determine user intent. Table 1 listed below provides an example of just one set of parameters. In this case, the parameters include time (e.g. indicating order and duration the finger is in an individual volume), candidate key character, volume, and whether the user stopped his finger in the volume.

TABLE 1

| Time | Key Candidates | Volume | Finger Stop? |
| --- | --- | --- | --- |
| 00:00 | F | 0.5 | Yes |
| 00:00 | F | 1.0 | No |
| 00:01 | D | 1.0 | No |
| 00:02 | S | 1.0 | No |
| 00:03 | A | 2.0 | No |
| 00:03 | A | 0.75 | Yes |
| 00:04 | Z | 0.1 | No |
| 00:05 | X | 1.0 | No |
| 00:06 | C | 0.75 | No |
| 00:07 | C | 0.5 | Yes |
| 00:07 | V | 0.5 | Yes |
| 00:08 | V | 1.0 | No |
| 00:09 | F | 1.0 | No |
| 00:10 | R | 0.8 | No |
| 00:11 | R | 0.5 | Yes |
| 00:12 | E | 0.5 | Yes |
| 00:13 | E | 1.5 | No |
| 00:14 | S | 0.5 | No |
| 00:15 | S | 1.0 | Yes |

In this case, the finger stop parameter can be associated with a higher probability of user intent to engage. Thus, the finger stop parameter can weight those candidate key characters higher than alternative candidate key characters.

The weighted characters from the path and their relative probabilities can be compared to a listing of known words, phrases, commands, etc. to identify potential matches. Assume that in this example, the listing is manifest as a dictionary and the potential matches for the characters of the path are 'faces' and 'faves' with 'faces' having a higher probability and 'faves' a lower probability. Note that the comparison can result in characters from the path being dropped (e.g., inadvertently passing through the key's volume). The comparison could also add characters that were missed, such as where the user slightly missed the intended keys. For instance, a path including 'Q A S' could produce a predicted word of 'WAS' because 'W' and 'Q' are adjacent and 'QAS' does not match any listings and 'WAS' does.

Note also that in the illustrated implementation, the path 126 is not visualized for the user. However, in other implementations, the path can be visualized for the user in real-time. This can provide a feedback mechanism that allows the user to adjust his/her engagement technique if the path does not reflect the keys the user intended to engage/ address. Similarly, an appearance of individual keys that are determined to be selected by the user can be changed as a form of visual feedback to the user. This visual feedback can allow the user to adjust his/her input technique if the key was not intended or speed up his/her input if the key was intended.

Figure 1L:
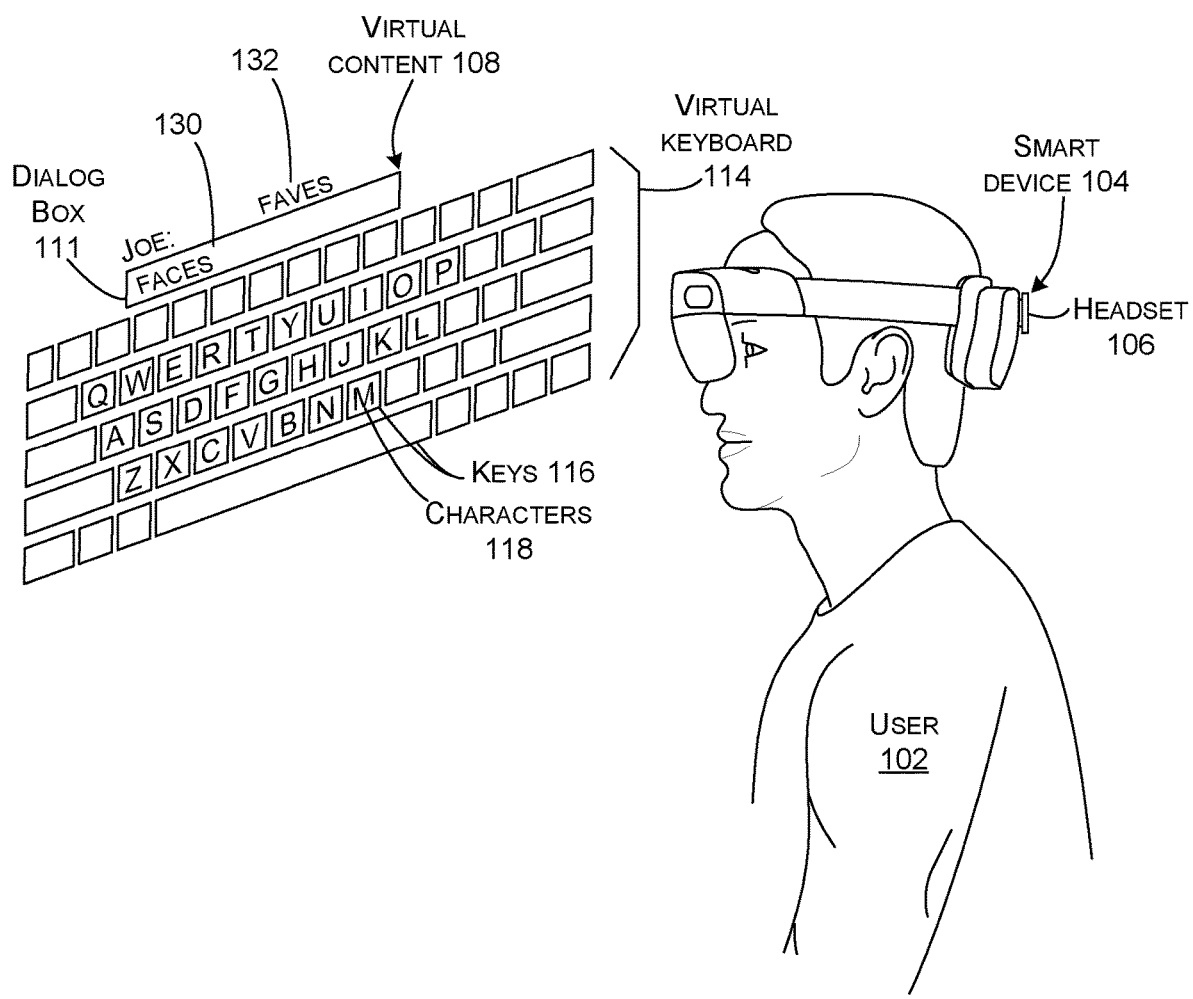

FIG. 1L shows user input that is associated with the user intent automatically generated on behalf of the user. In this case, the user input is manifest as the higher-ranking match (e.g., the predicted match) 'faces' automatically populated into the dialog box 111 at 130, while the lower-ranking match 'faves' is provided as an auto-suggestion option at 132. In this case, thresholds can be employed to determine a strategy. For instance, if the highest-ranking match exceeds a threshold then the highest-ranking match can be auto-populated into the dialog box.

engage and/or what the user intent was for the engagement (e.g., what word the user was attempting to spell). The machine learning solutions can provide improved accuracy for the user through actual use and/or training. For instance, machine learning may indicate that a particular user tends to dwell on an intended key for a long period and then overshoot intended keys and make rounded curves to the next intended key. As such, a parameter relating to keys on a curve of the path may be decreased in weight for determining user intent (e.g., less indicative of user intent) while a parameter relating to dwell time may be increased in weight (more indicative of user intent).

As mentioned above many different parameters can be utilized to determine user intent to engage individual keys (e.g., what keys did the user want to activate) and to predict overall user intent (e.g., what word or command was the user trying to enter). These parameters can be utilized in various ways to make the determinations and the predictions. One such example technique is pasted below as Table 2. Other example techniques are contemplated.

TABLE 2

```
struct key_hit
{
  int _timestamp;  // Time finger hit key
  wchar_t _c;      // Character of the key
  double _weight;  // Weight of finger hitting key (determined by speed,
intersection of finger and key volume)
  bool_stop;       // Did the finger stop on the key?
};
vector<string> generate_candidates(vector<key_hit> hits,
unordered_set<wstring> dictionary)
{
  vector<key_hit> reduced_hits;
  // Remove hits which occur before or after a finger stop of the same key
  reduced_hits = reduce_finger_stops(hits);
  // Remove hits where a finger only glanced a key (say weight is 20% or
less)
  reduced_hits = remove_hits_below_weight_threshold(reduced_hits);
  vector<vector<key_hit>> character_propabilities;
  // Create a directed graph of characters. Characters must appear in this
order in the word.
  //_stop with _weight >= 1 is 100% probable letter, indicated by *.
Remainder between these are probable characters to evaluate
  //Ex:
  // {F*}, {D,S}, {A*}, {X,C,V}, {F,R}, {E*}, {S*}
  character_propabilities = build_probable_character_order(reduced_hits);
  vector<string> combination_words;
  // Build the words from the probabilities.
  // Character sets are expanded into possible combinations.
  // Letters must appear in the order they came in because finger moved
through candidate keys in a given order. Must consider that none of the
characters are in the word
  // {F*} - must be in word
  // {D,S} - candidates {}, {D}, {S} and {D,S}
  // {A*} - must in in word
  // {X,C,V} - candidates {}, {X}, {C}, {V}, {X,C}, {C,V}, {X,C,V}
  // {F, R} - candidates {}, {F}, {R}, {F,R}
  // {E*} - must be in word
  // {S*} - must be in word
  //
  // Total of 4*7*4 = 112 possible words
  // Output starts with FAES, FDAES, FSAES, FDSAES, FAXES, FACES,
FAVES, FAXCES . . .
  combination_words = create_combination_words(combination_words);
  vector<string> candidate_words;
  // Reduce to real words in user's language
  // Output includes FACES, FAVES, etc.
  candidate_words = lookup_language_dictionary(word_combinations);
  return candidate_words;
}
```

Note that various forms of machine learning can be applied to the process described above of analyzing path parameters to determine which keys the user intended to In this example technique, the 'structured key_hit' section identifies keys engaged by the user utilizing multiple parameters (see Table 1) (e.g., time finger hit key, character of the key, weight of finger hitting key (this parameter is based off of multiple other listed parameters), and whether the finger stopped on the key).

The 'generate candidates' section utilizes additional parameters to remove likely inadvertent key hits. The 'character_probabilities' section creates a directed graph of character probabilities. The 'combination_words' section builds potential words from the directed graph. The 'candidate_words' section filters the combination words against references, such as a dictionary. Finally, the technique returns the candidate words (e.g., see FIG. 1L).

FIGS. 2A-2H relate to a scenario 100A that is similar to the scenario of FIGS. 1A-1L. As such, elements are not reintroduced for sake of brevity. Scenario 100A includes a parameter that relates to finger movement parallel to the virtual keyboard through the volumes 122 (e.g. relative to the xz-reference plane). This scenario also includes another parameter that relates to finger movement perpendicular to the virtual keyboard through the volumes 122 (e.g., parallel to the y-reference axis). Movement in the volumes that is toward and/or away from virtual keyboard 114 can be indicative of user intent to address a key 116. This correlation can be strong whether the movement is in the volume in front of the key (e.g. on the user's side of the key, through the key, and/or behind the key (e.g., on an opposite side of the key from the user).

Figure 2A:
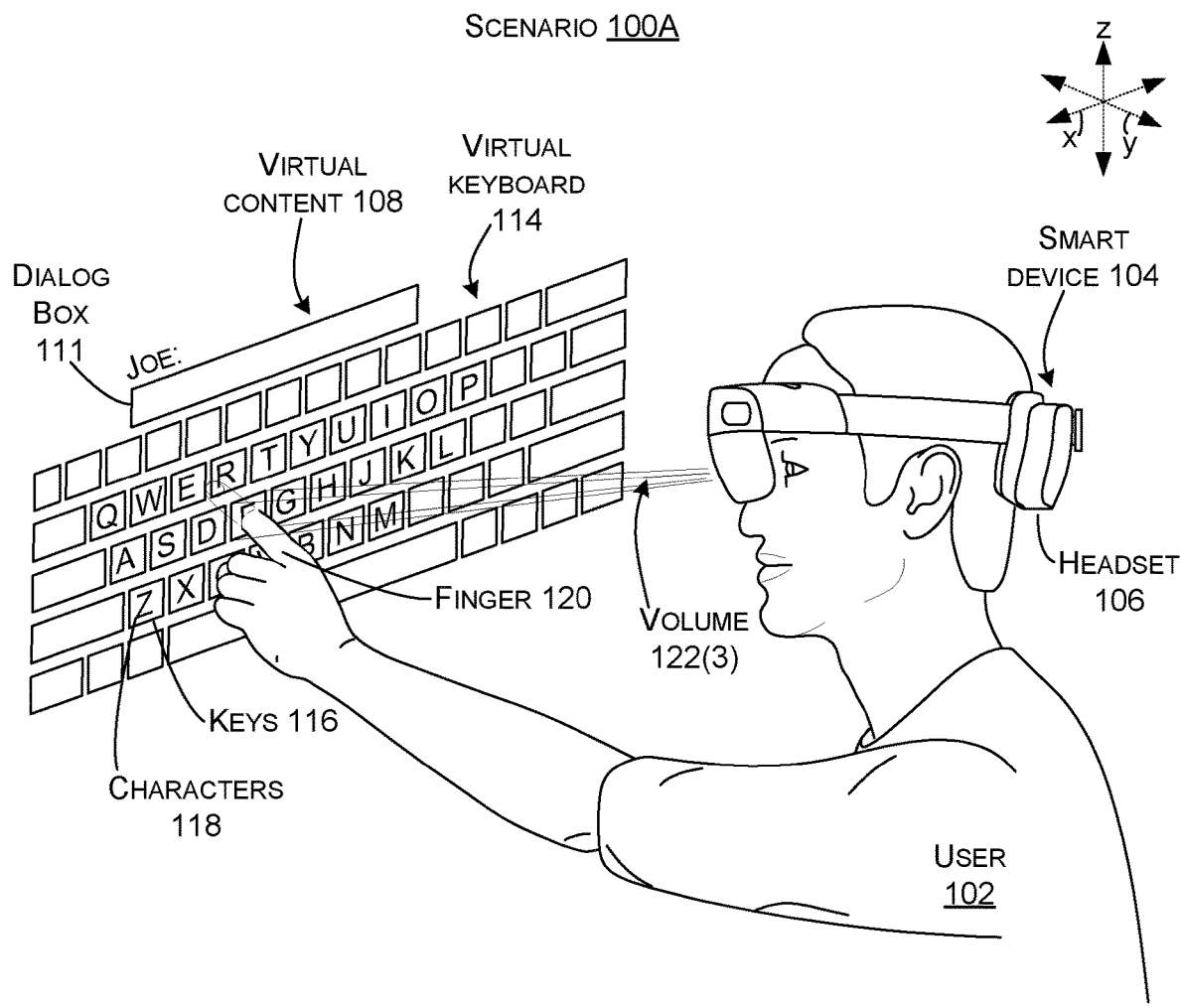
Figure 2B:
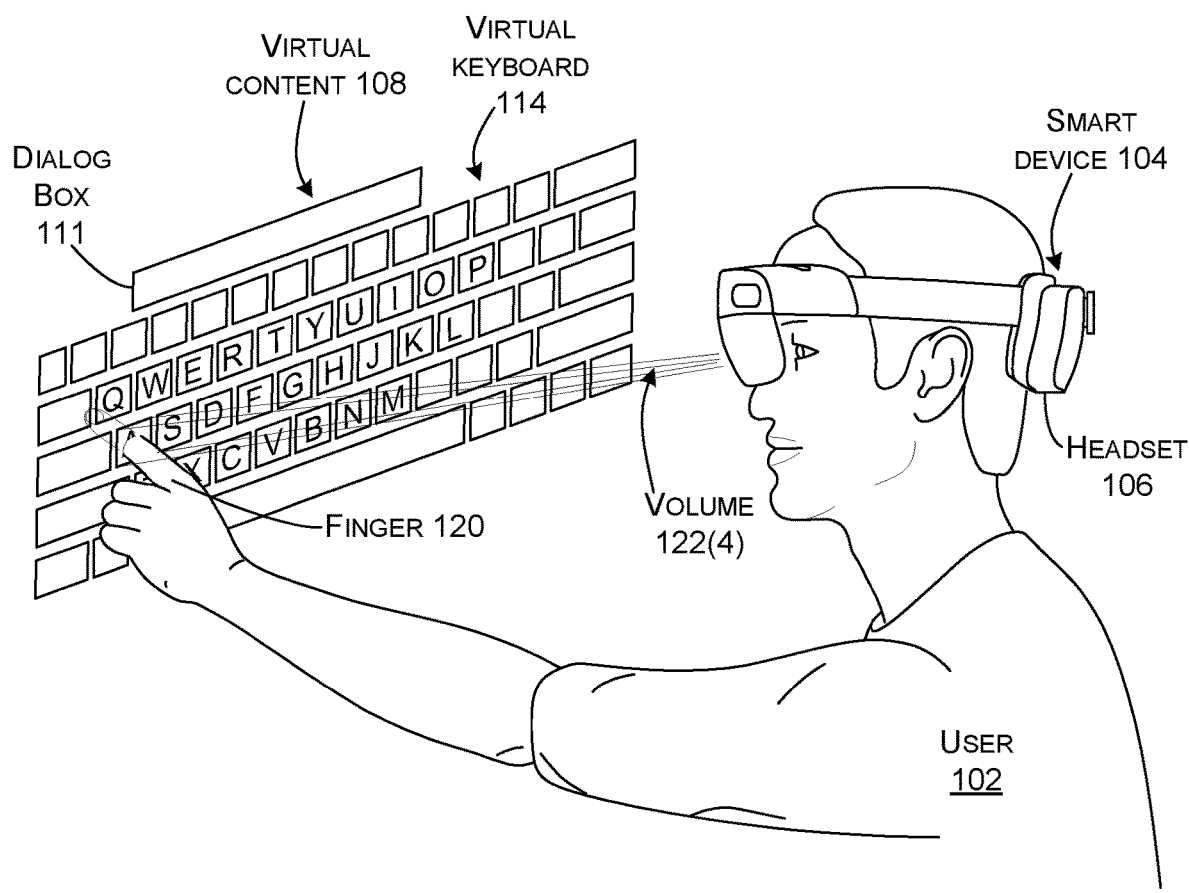
Figure 2C:
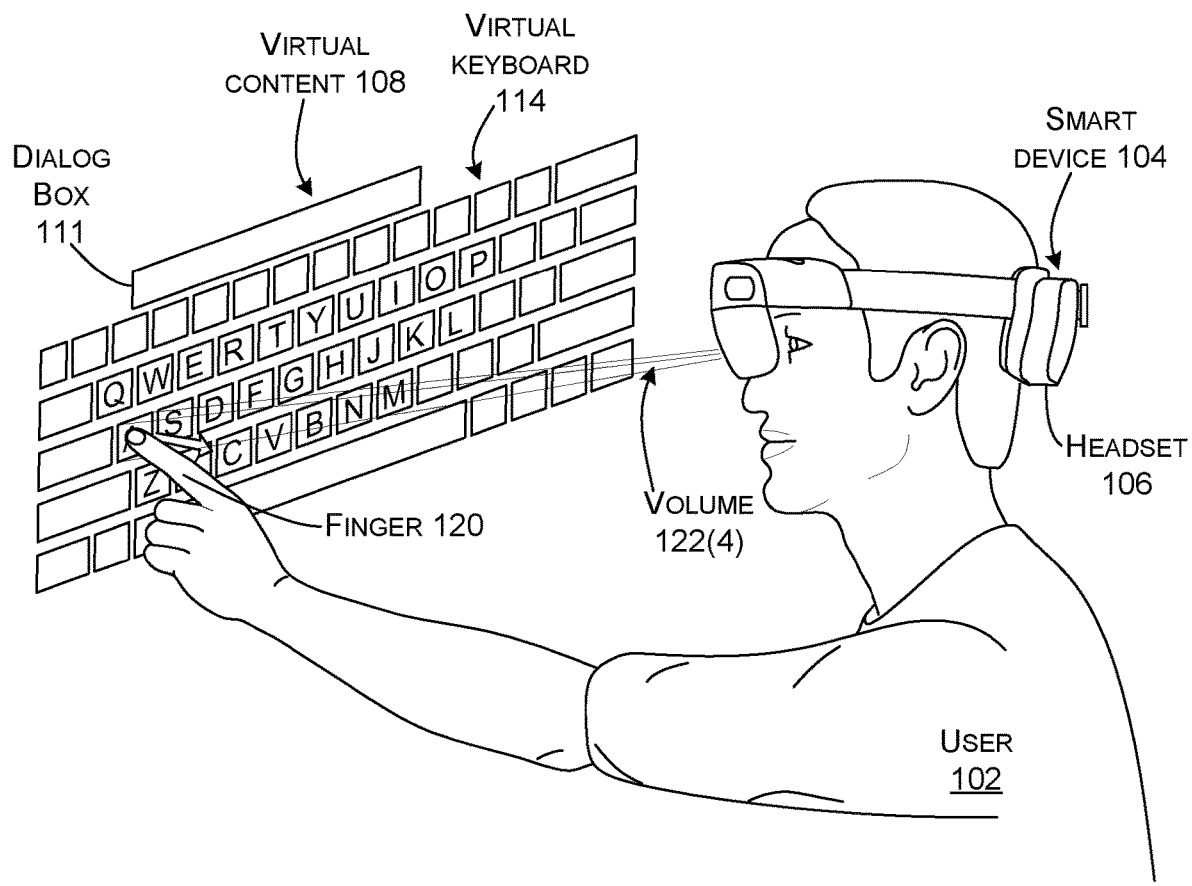

FIG. 2A shows the user's finger 120 in volume 122(3) associated with the 'F' key. Further, the user is simulating engaging the key by moving his finger toward the virtual keyboard 114 in the volume. This motion can be highly predictive of user intent to address the 'F' key. FIG. 2B shows the user having moved his finger laterally to the 'A' key (e.g., through the intervening 'D' and 'S' keys) with the finger remaining the same distance from the user in the y-reference direction as FIG. 2A. FIG. 2C shows the user withdrawing his finger (in the −y direction) within the volume of the 'A' key. This motion can be indicative of the user intending to address the 'A' key. Thus, the user's finger has so far moved through the volumes for the 'F,' 'D,' 'S,' and 'A' keys in the x-reference direction. This aspect can be represented by a first parameter.

This first parameter can be indicative of user intent to select these keys. Further, the user moved in the y-reference direction relative to the 'F' and 'A' keys, which can be represented by the second parameter. Keys that are included in both sets (e.g., associated with the first parameter and the second parameter) can have a higher probability of user intent to address the key than those associated with only the first parameter. This aspect can allow the present virtual keyboard engagement techniques to be much more fluid and faster than existing techniques. For instance, in traditional techniques the user would have to attempt to engage the 'F' key, then withdraw his/her finger and await confirmation that the 'F' key was activated and then attempt to engage the 'A' key. In the present implementations, the user can simply slide across the intervening 'D' and 'S' keys to the 'A' key with confidence that the techniques will accurately determine which keys the user intended to activate. Stated another way, the path of the user's finger can be curved in one, two, or all three of the reference directions. A curved path relating to multiple keys can be much faster for the user than discrete movements directed at single keys. Deriving parameters relating to the curved path can allow highly accurate predictions to be made regarding user intent while increasing user speed of entry.

Figure 2D:
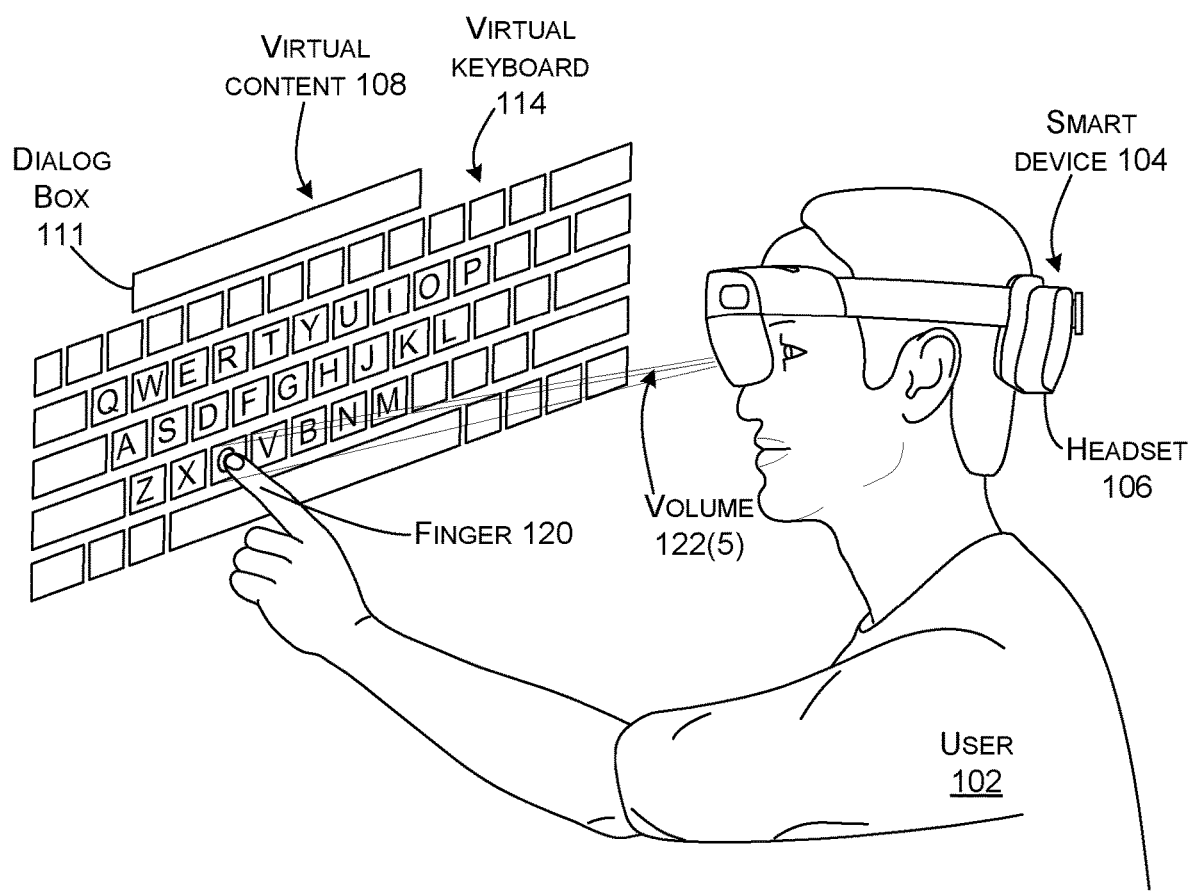
Figure 2E:
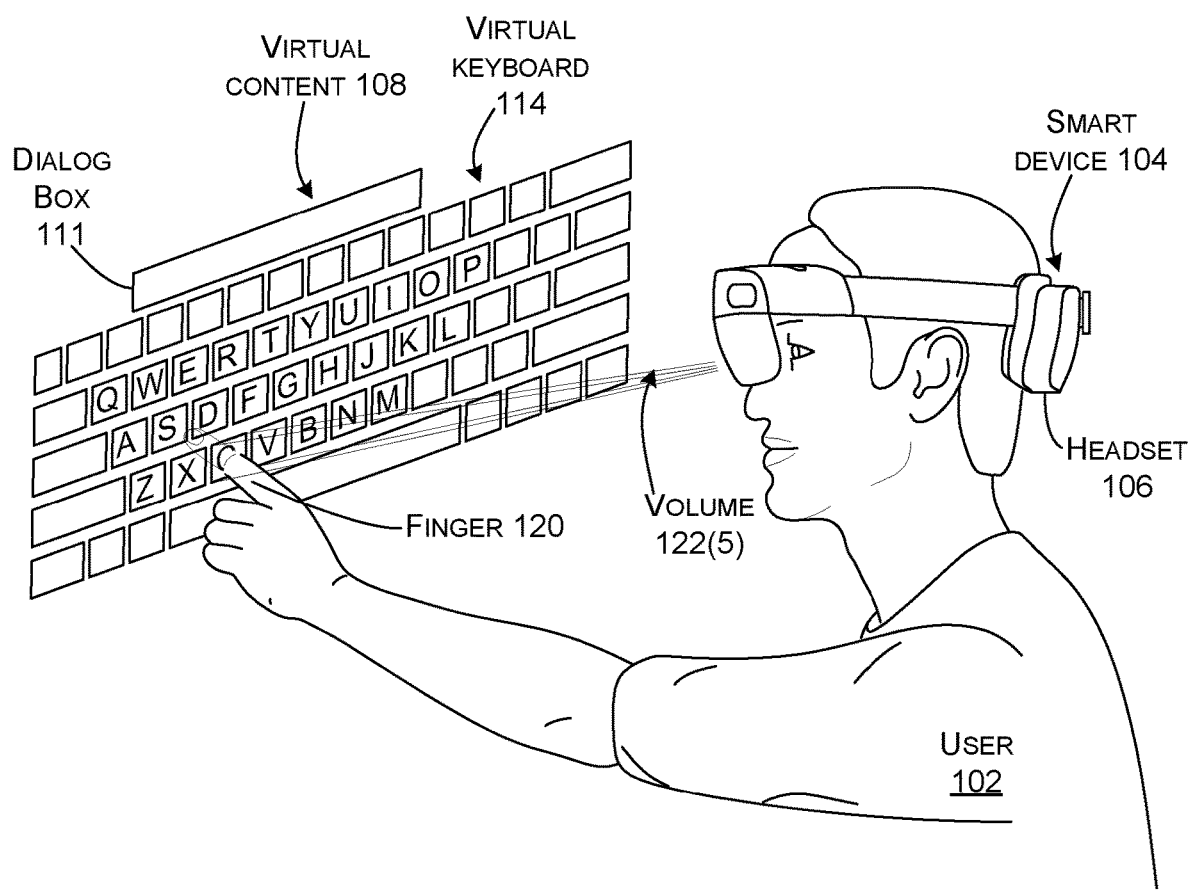
Figure 2F:
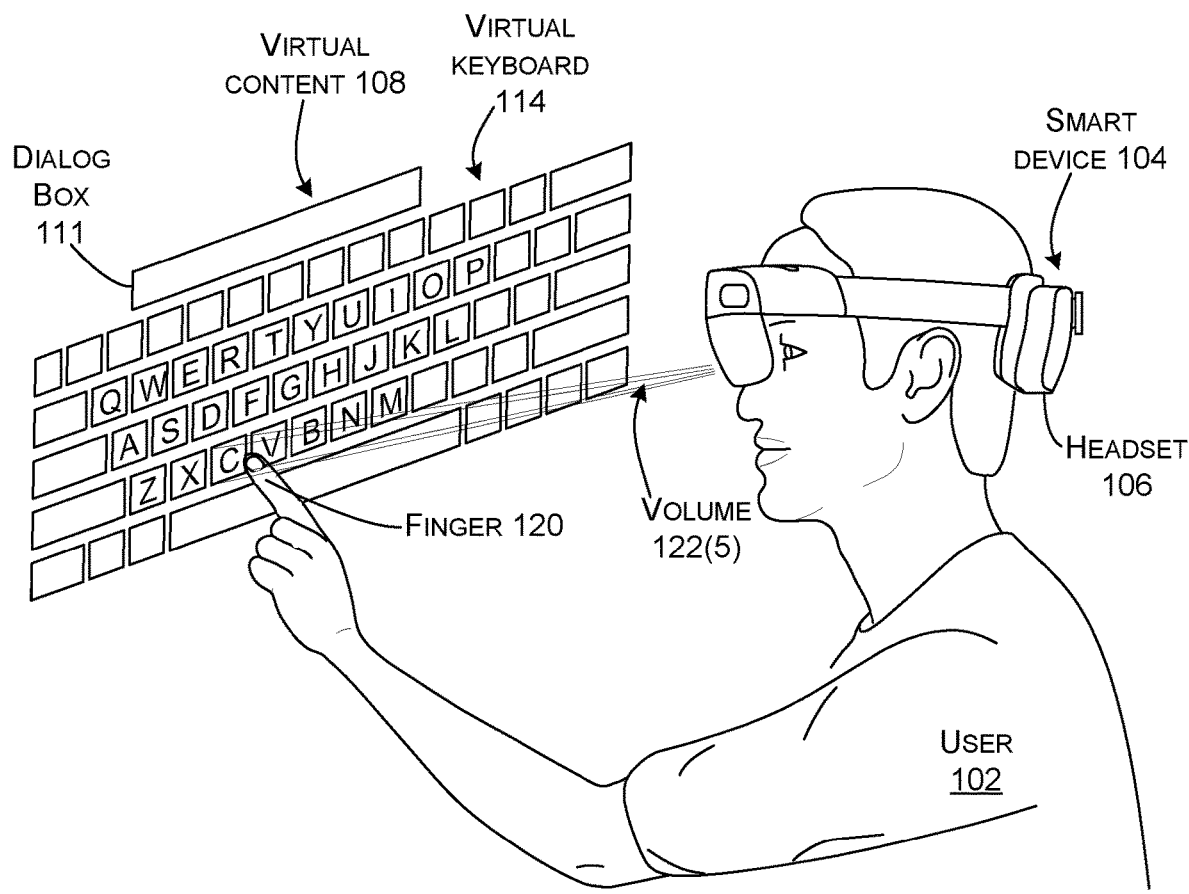

FIG. 2D shows the user moved his finger 120 laterally to the volume 122(5) associated with the 'C' key. FIG. 2E shows the user moving his finger 120 perpendicular to the 'C' key while in the volume 122(5). In this case, the movement is away from the user. FIG. 2F shows the user moving the finger back out (e.g., toward the user) while still in the volume 122(5) associated with the 'C' key.

Figure 2G:
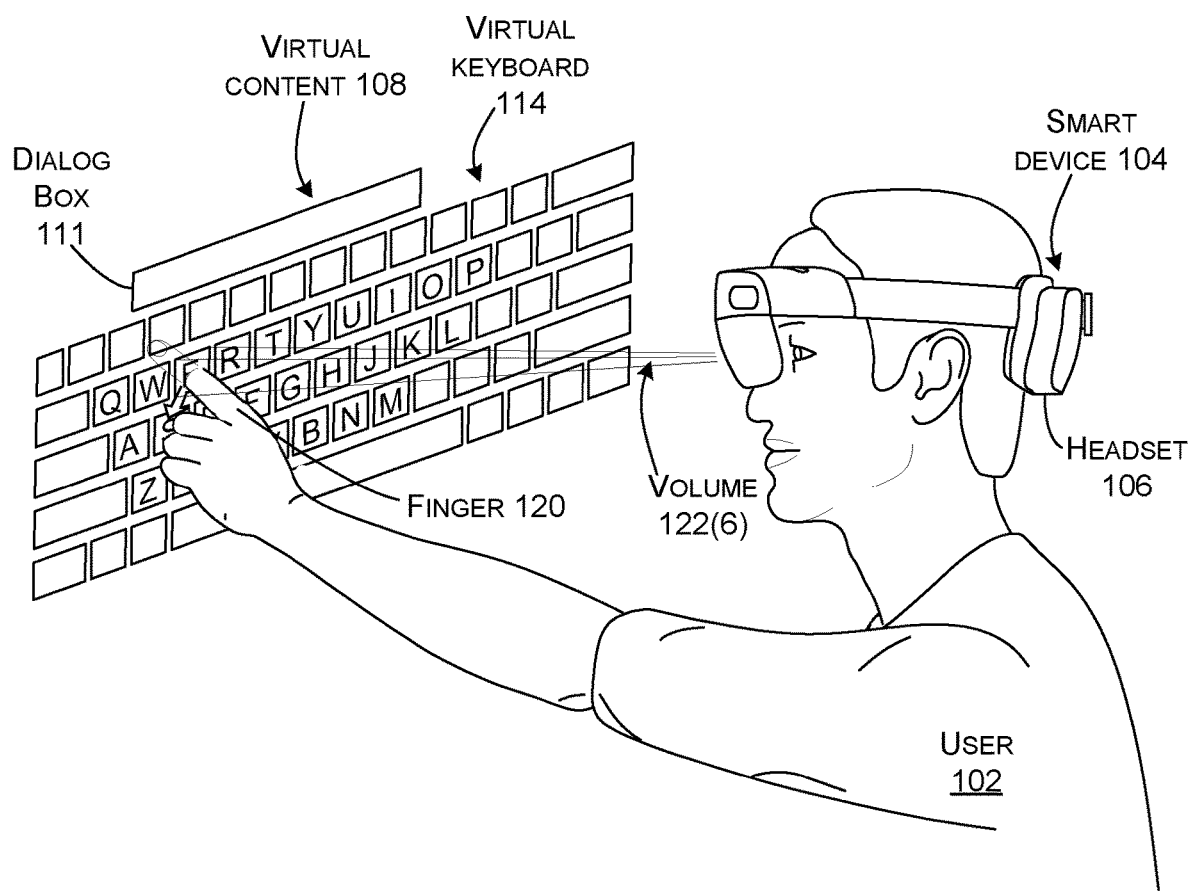
Figure 2H:
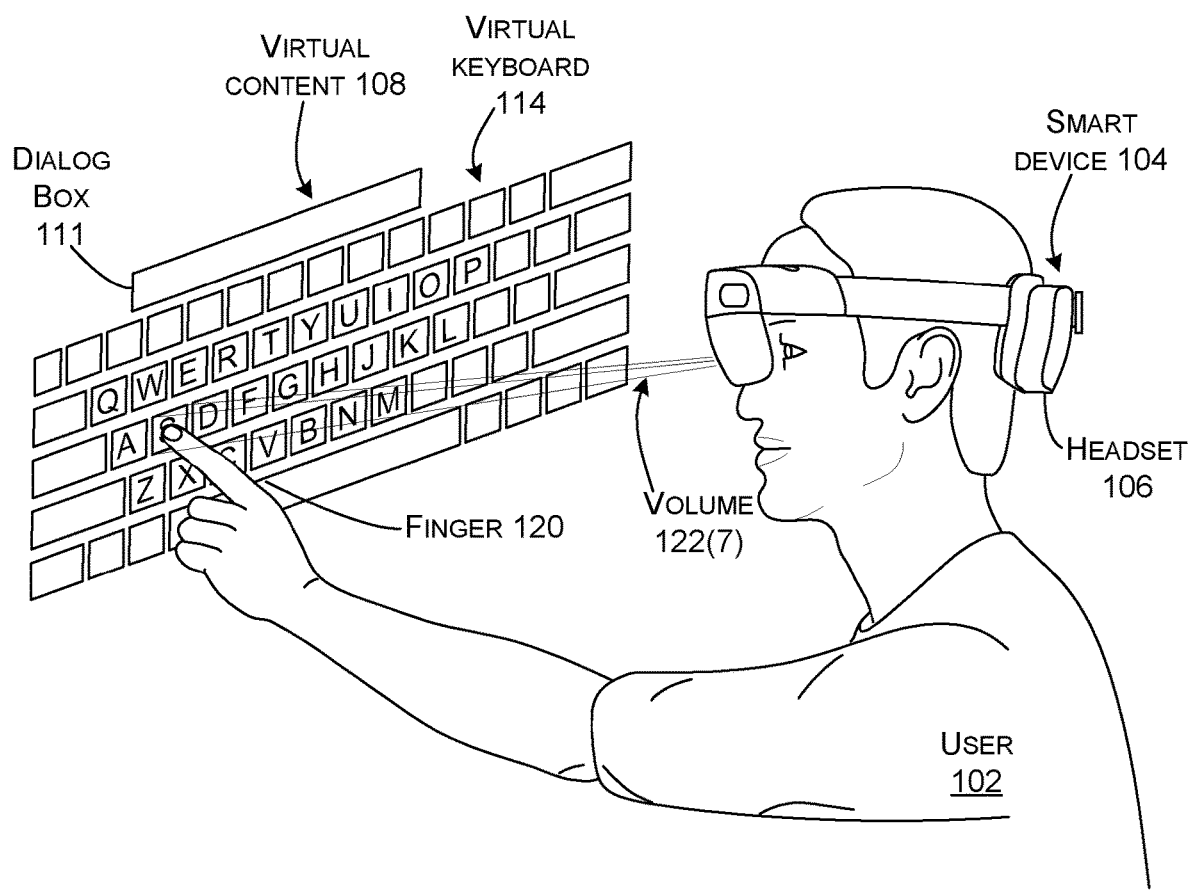

FIG. 2G shows the user moved the finger up to the volume 122(6) associated with the 'E' key and is moving the finger perpendicular to the virtual keyboard (e.g., toward the virtual keyboard in this case). FIG. 2H shows the user moved the finger to the volume 122(7) associated with the 'S' key and then moving perpendicular to the virtual keyboard (e.g., toward the user in the −y reference direction in this case). The prediction of user intent based upon this set of parameters may be the same as discussed relative to scenario 100 above, but the confidence levels (e.g., probabilities) of the prediction may be higher than obtained with the set of parameters employed above. Further, other parameters can be included in the set of parameters. For instance, where the user is looking (e.g., what key the user is looking at) may be treated as another parameter. Similarly, the user's hand pose may be treated as another parameter. For instance, the user may tend to hold his/her palms parallel to the major surface of the keyboard when intending to type. If in contrast, the user's hand is shaped like a first with a finger extending from the fist, the user may be pointing at something in the scene rather than typing.

The multiple parameters relating to the path can provide disambiguation of potential user key selections. This can be especially pronounced in machine learning scenarios. For instance, as mentioned above, some keys can include two characters. For instance, the '2' character and the '@' character can occur on a single key. Machine learning techniques could indicate that when this key is engaged by the user and the previously activated character was a letter then the user intended to select the '@' character and if the previously activated character was a number then the user intended to select the '2' character. Thus, user intent can be accurately determined (e.g., with high probability) despite the user tracing a pathway over multiple closely spaced keys using disambiguation involving multiple parameters.

FIG. 3 shows an alternative key volume shape. In this case, the key volumes 122B are cuboids that extend toward and away from the user relative to the virtual keyboard 114B as 3D keys. In this implementation, the volumes 122B are visualized for the user as the 3D keys. The user can see whether his/her finger (or other input device) is within the volume of an individual key that he/she is trying to select. This configuration can provide visual feedback to the user whether the user action will be interpreted as an attempt to engage that individual key. As mentioned, the path can be visually traced behind the user's finger in real-time as another feedback mechanism to the user.

Note, the frustrum shaped key volumes and the cuboid shaped key volumes are illustrated examples of key volumes that can be sensed for user engagement. Other volume shapes can satisfy this functionality.

Figure 4:
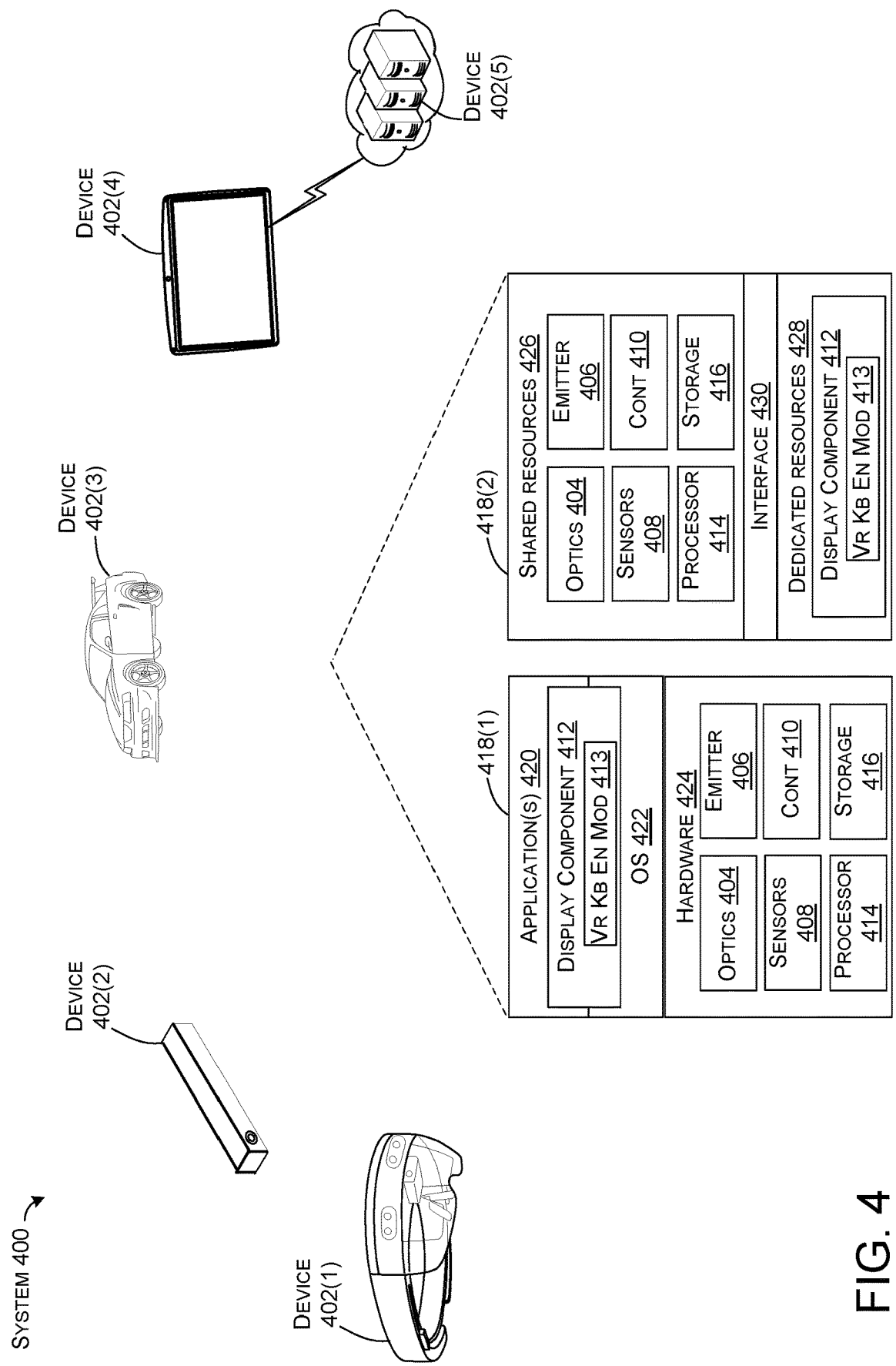
FIG. 4 shows example virtual keyboard engagement systems in accordance with some implementations of the present concepts.

FIG. 4 shows a system 400 that can accomplish virtual keyboard engagement concepts. For purposes of explanation, system 400 can include several smart devices 402(1), 402(2), 402(3), 402(4), and 402(5). Device 402(1) is manifest as a headset that is similar to headset 106 of FIG. 1A. Device 402(2) is manifest as depth sensor and projection device, device 402(3) is manifest as a car, and device 402(4) is manifest as a tablet-type device. Any of devices 402(1)-402(4) can be operated in a free-standing manner and/or can communicate with other devices, such as device 402(5). This device 402(5) may be local to or remote from the other devices and may contribute resources, such as processing and/or storage resource to shared operating scenarios with any of devices 402(1)-402(4). Individual devices 402 can include optics 404, emitters 406, sensors 408, controller 410, a display component 412, a virtual keyboard engagement module 413, a processor 414, and/or storage/memory 416.

FIG. 4 shows two device configurations 418 that can be employed by devices 402. Individual devices 402 can employ either of configurations 418(1) or 418(2), or an alternate configuration. (Due to space constraints on the drawing page, one instance of each device configuration is illustrated rather than illustrating the device configurations relative to each device 402). Briefly, device configuration 418(1) represents an operating system (OS) centric configuration. Device configuration 418(2) represents a system on a chip (SOC) configuration. Device configuration 418(1) is organized into one or more applications 420, operating system 422, and hardware 424. Device configuration 418(2) is organized into shared resources 426, dedicated resources 428, and an interface 430 therebetween.

In some implementations, the optics 404 can include lenses that can focus emitted (outgoing light) and/or light from the scene (incoming light). The emitters 406 can emit light for generating virtual content and/or for reflecting off of the scene, such as for depth sensing. The sensors 408 can sense light received from the scene, the user's eye position, etc. Stated another way, the sensors can include inwardly looking sensors and/or outwardly looking sensors. Note that while the optics 404, emitters 406, and sensors 408 can be discrete components, they can also be integrated. For instance, the emitters may emit light that creates images (e.g., the virtual content) in the optics, such as via a waveguide.

Further, the emitters 406, optics 404, and/or sensors 408 can work cooperatively to achieve the depth sensing functionality. For instance, the emitters 406 and optics 404 can project patterned light, such as patterned infrared (IR) light. Some of the patterned IR light can be reflected from the scene and sensed by the sensors 408. Depth information can be derived from the sensed patterned IR light. In other cases, dual sets of sensors can be used to generate stereoscopic images of the scene. Depth information can be derived from the stereoscopic images. As technology evolves depth information can be derived from various types of sensed data, such pairs of images sensed by the sensors.

The controller 410 can coordinate the function of the emitters 406 and/or the sensors 408. For instance, the display component 412 can generate virtual content that can be emitted by the emitters 406 so that the virtual content including the virtual keyboard appears to be projected at a set of 3D coordinates in front of the user (in front of the user's eyes). Thus, the 3D location of individual virtual keys is determined by 3D coordinates. As mentioned above, users can have difficulty determining how far away the virtual keyboard is in front of them (in the y-reference direction) and providing feedback to the user to indicate they are engaging the keyboard has proven elusive. To address this deficiency, the virtual keyboard engagement module 413 can monitor various parameters associated with user movement to determine whether the user is attempting to activate the keyboard generally and individual keys specifically. Toward this end, the virtual keyboard engagement module can monitor key volumes rather than simple 2D planar key surfaces for user engagement.

Stated another way, the virtual keyboard engagement module 413 can utilize 3D depth information (from the sensors 408) about user movements relative to key volumes defined relative to the virtual keys and the user as a parameter relating to user intent to select individual virtual keys. Stated another way, the virtual keyboard engagement module 413 can correlate the 3D location of the key volumes with the 3D location of user movements. The virtual keyboard engagement module 413 can derive various parameters from the correlation. The virtual keyboard engagement module 413 can utilize these parameters to attempt to predict an intended user action from the user engagement. The virtual keyboard engagement module 413 can use the predicted intended user action in an attempt to facilitate the user experience (e.g., populate a word or phrase the user intended to type or enter a command the user intended to convey).

In some configurations, each of devices 402 can have an instance of the virtual keyboard engagement module 413. However, the functionalities that can be performed by the virtual keyboard engagement module 413 may be the same or they may be different from one another. For instance, in some cases, each device's virtual keyboard engagement module 413 can be robust and provide all of the functionality described above and below (e.g., a device-centric implementation).

In other cases, some devices 402 can employ a less robust instance of the virtual keyboard engagement module 413 that relies on some functionality to be performed by another device. For instance, device 402(5) may have more processing resources than device 402(1). In such a configuration, some virtual keyboard engagement functions may be performed on device 402(5) rather than device 402(1). For instance, parameter tracking could be performed locally on device 402(1). The parameters could be conveyed to device 402(5), which can perform the prediction functionality based upon the parameters and return the prediction to device 402(1). In another case, device 402(1) could generate virtual content, while device 402(2) provided depth sensing that captured the user. Device 402(2) could communicate the depth information to device 402(1), which could identify user interactions with the virtual content from the depth information.

The term "device," "computer," or "computing device" as used herein can mean any type of device that has some amount of processing capability and/or storage capability. Processing capability can be provided by one or more processors that can execute data in the form of computer-readable instructions to provide a functionality. Data, such as computer-readable instructions and/or user-related data, can be stored on storage, such as storage that can be internal or external to the device. The storage can include any one or more of volatile or non-volatile memory, hard drives, flash storage devices, and/or optical storage devices (e.g., CDs, DVDs etc.), remote storage (e.g., cloud-based storage), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

Examples of devices 402 can include traditional computing devices, such as personal computers, desktop computers, servers, notebook computers, vehicles, smart cameras, surveillance devices/systems, safety devices/systems, smart glasses, wearable smart devices, appliances, and other developing and/or yet to be developed device types, etc.

As mentioned above, device configuration 418(2) can be thought of as a system on a chip (SOC) type design. In such a case, functionality provided by the device can be integrated on a single SOC or multiple coupled SOCs. One or more processors 414 can be configured to coordinate with shared resources 426, such as storage/memory 416, etc., and/or one or more dedicated resources 428, such as hardware blocks configured to perform certain specific functionality. Thus, the term "processor" as used herein can also refer to central processing units (CPUs), graphical processing units (GPUs), field programable gate arrays (FPGAs), controllers, microcontrollers, processor cores, or other types of processing devices.

Generally, any of the functions described herein can be implemented using software, firmware, hardware (e.g., fixed-logic circuitry), or a combination of these implementations. The term "component" as used herein generally represents software, firmware, hardware, whole devices or networks, or a combination thereof. In the case of a software implementation, for instance, these may represent program code that performs specified tasks when executed on a processor (e.g., CPU or CPUs). The program code can be stored in one or more computer-readable memory devices, such as computer-readable storage media. The features and techniques of the component are platform-independent, meaning that they may be implemented on a variety of commercial computing platforms having a variety of processing configurations.

Figure 5:
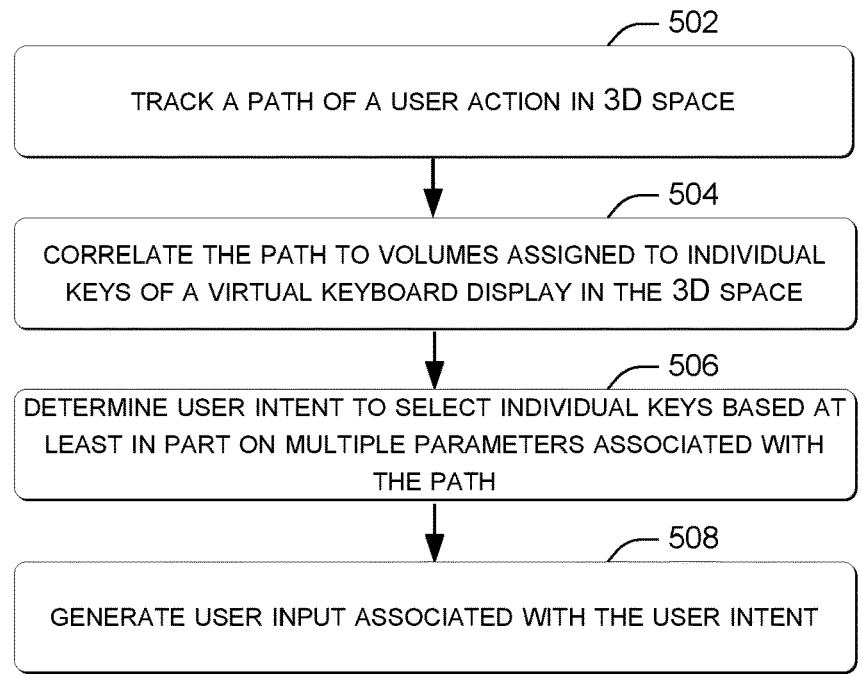
FIGS. 5-7 show flowcharts of example virtual keyboard engagement methods that can implement some of the present concepts in accordance with some implementations.

FIG. 5 shows a flowchart of a virtual keyboard engagement technique or method 500.

At block 502, the method can track a path of a user action in 3D space.

At block 504, the method can correlate the path to volumes assigned to individual keys of a virtual keyboard display in the 3D space.

At block 506, the method can determine user intent to select individual keys based at least in part on multiple parameters associated with the path.

At block 508, the method can generate user input associated with the user intent. For instance, the method can automatically enter user input in the form of a word, phrase, and/or command on behalf of the user.

Figure 6:
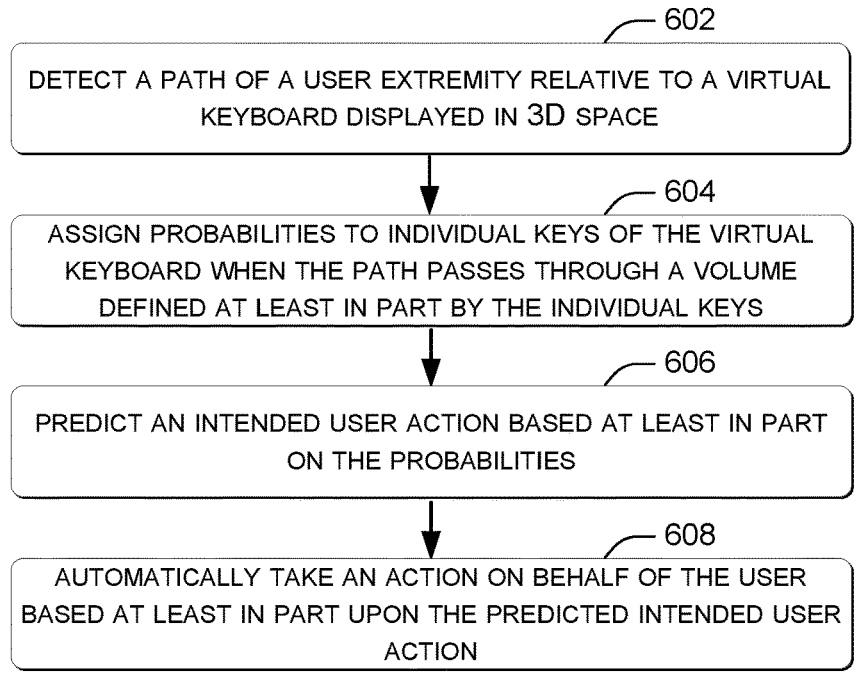

FIG. 6 shows a flowchart of another virtual keyboard engagement technique or method 600.

At block 602, the method can detect a path of a user extremity relative to a virtual keyboard displayed in 3D space. The path can be a curved 3D path relating to multiple keys. In some cases, detecting a path of a user extremity can entail detecting the path of a finger, multiple fingers, a hand, and/or an object held in the hand, among others.

At block 604, the method can assign probabilities to individual keys of the virtual keyboard when the path passes through a volume defined at least in part by the individual keys. In some cases, assigning probabilities to individual keys of the virtual keyboard can entail assigning a first probability to an individual key of the keyboard when the path passes through a volume defined at least in part by the individual key. In other cases, assigning probabilities to individual keys of the virtual keyboard can entail assigning a first probability to an individual key of the keyboard when the path passes relative to the individual key under first parameters and assigning a second higher probability to another individual key when the path passes relative to the another individual key under second parameters.

At block 606, the method can predict an intended user action based at least in part on the probabilities.

At block 608, the method can automatically take an action on behalf of the user based at least in part upon the predicted intended user action. In some implementations, taking an action can entail populating a dialog box with a word selected based at least in part upon the assigned probabilities.

Figure 7:
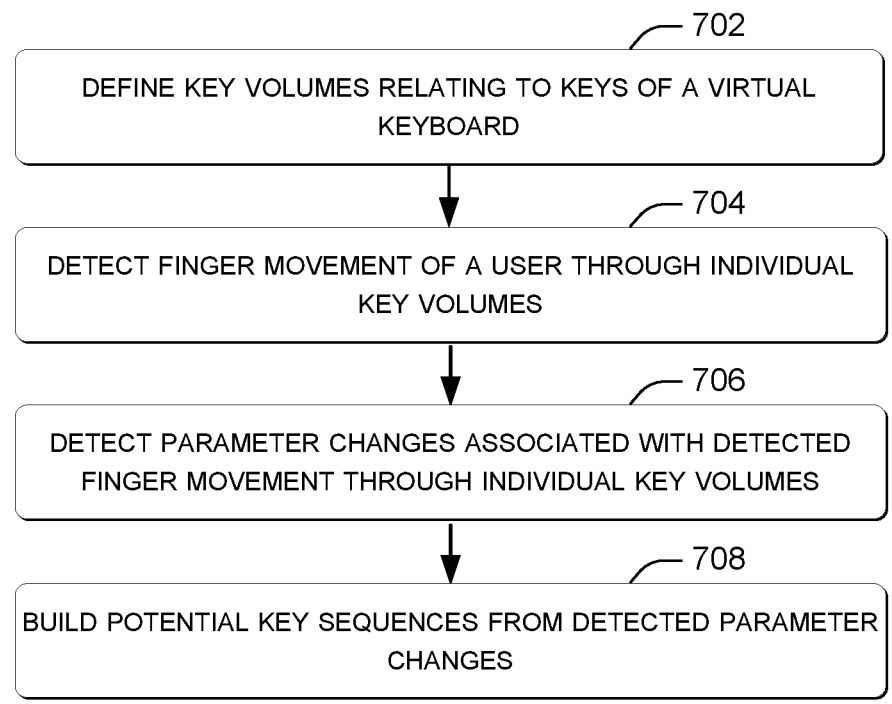

FIG. 7 illustrates another virtual keyboard engagement technique or method 700.

At block 702, the method can define key volumes relating to keys of a virtual keyboard. In some cases, defining key volumes can entail defining cuboids that include the keys, or defining frustrums extending between eyes of the user and the keys.

At block 704, the method can detect finger movement of a user through individual key volumes.

At block 706, the method can detect parameter changes associated with detected finger movement through individual key volumes. In some cases, detecting parameter changes can entail detecting changes in direction and/or changes in velocity. In some cases, the direction changes can entail direction changes parallel to a key surface and/or perpendicular to the key surface. In some cases, detecting parameter changes can further entail assigning higher probabilities to individual keys in the potential key sequences associated with parameter changes.

At block 708, the method can build potential key sequences from detected parameter changes. The potential key sequences can be compared to known words and/or known user commands.

The described methods can be performed by the systems and/or elements described above and/or below, and/or by other devices and/or systems.

The order in which the methods are described is not intended to be construed as a limitation, and any number of the described acts can be combined in any order to implement the method, or an alternate method. Furthermore, the method can be implemented in any suitable hardware, software, firmware, or combination thereof, such that a device can implement the method. In one case, the method is stored on one or more computer-readable storage medium/media as a set of instructions (e.g., computer-readable instructions or computer-executable instructions) such that execution by a processor of a computing device causes the computing device to perform the method.

Various examples are described above. Additional examples are described below. One example includes a device comprising a display component configured to display virtual content relative to a scene, sensors configured to monitor volumes of the scene associated with the virtual content, and a controller configured to assign probabilities to movement relative to the volumes and to predict an intended user action based at least in part on the probabilities.

Another example can include any of the above and/or below examples where the virtual content comprises a keyboard or wherein the virtual content comprises multiple user selectable elements.

Another example can include any of the above and/or below examples where the sensors are configured to detect parameters associated with the movement of a user extremity through the volumes.

Another example can include any of the above and/or below examples where the parameters relate to velocity and direction relative to individual volumes.

Another example can include any of the above and/or below examples where the virtual content is associated with keys associated with characters, and wherein the controller is configured to compare a sequence of characters associated with the movement to a dictionary of known words to predict the intended user action as spelling an individual word from the dictionary.

Another example can include any of the above and/or below examples where the controller is configured to perform the intended user action.

Another example can include any of the above and/or below examples where the controller is configured to perform the intended user action by auto-populating the individual word into a dialog box or providing the individual word as an auto-suggestion for the dialog box.

Another example can include any of the above and/or below examples where the controller is configured to perform the auto-populating when a confidence associated with the individual word exceeds a threshold.

Another example includes a device-implemented method comprising detecting a path of a user extremity relative to a virtual keyboard displayed in 3D space, assigning probabilities to individual keys of the virtual keyboard when the path passes through a volume defined at least in part by the individual keys, predicting an intended user action based at least in part on the probabilities, and automatically taking an action on behalf of the user based at least in part upon the predicted intended user action.

Another example can include any of the above and/or below examples where detecting a path of a user extremity comprises detecting the path of a finger, multiple fingers, a hand, fingers of both a left and right hand, and/or an object held in the hand.

Another example can include any of the above and/or below examples where assigning probabilities to individual keys of the virtual keyboard comprises assigning a first probability to an individual key of the virtual keyboard when the path passes through a volume defined at least in part by the individual key.

Another example can include any of the above and/or below examples where assigning probabilities to individual keys of the virtual keyboard comprises assigning a first probability to an individual key of the keyboard when the path passes relative to the individual key under first parameters and assigning a second higher probability to another individual key when the path passes relative to the another individual key under second parameters.

Another example can include any of the above and/or below examples where taking an action comprises populating a dialog box with a word selected based at least in part upon the assigned probabilities.

Another example includes a device-implemented method comprising defining key volumes relating to keys of a virtual keyboard, detecting finger movement of a user through individual key volumes, detecting parameter changes associated with detected finger movement through individual key volumes, and building potential key sequences from detected parameter changes.

Another example can include any of the above and/or below examples where the defining key volumes comprises defining cuboids that include the keys, or wherein the defining key volumes comprises defining frustrums that include the keys.

Another example can include any of the above and/or below examples where detecting parameter changes comprises detecting changes in direction and/or changes in velocity.

Another example can include any of the above and/or below examples where detecting parameter changes in direction comprises detecting changes in direction parallel to a key surface and/or perpendicular to the key surface.

Another example can include any of the above and/or below examples where the detecting parameter changes further comprises assigning higher probabilities to individual keys in the potential key sequences associated with parameter changes.

Another example can include any of the above and/or below examples where the device-implemented method further comprises comparing the potential key sequences to known words.

Another example can include any of the above and/or below examples where the device-implemented method further comprises comparing the potential key sequences to known user commands.

Another example includes a device-implemented method comprising tracking a path of a user action in 3D space, correlating the path to volumes assigned to individual keys of a virtual keyboard display in the 3D space, determining user intent to select individual keys based at least in part on multiple parameters associated with the path, and generating user input associated with the user intent.

CONCLUSION

Although the subject matter relating to virtual keyboard engagement has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A device, comprising:
   a display configured to be positioned on a head of a user in front of the user's eyes and configured to generate virtual content that appears to the user in a scene and that includes virtual keys;
   sensors configured to monitor volumes defined at least in part by individual virtual keys and that extend both toward and away from the user relative to the virtual keys; and,
   a processor configured to assign first probabilities to movement of a user extremity through individual volumes that is parallel to the virtual keys and dwell time of the user extremity is below a threshold and to assign second higher probabilities to user movement through individual volumes that is toward the user in the volume and where the user movement is away from the user in the volume and the dwell time of the user extremity is above the threshold and to predict an intended user action relative to the virtual content utilizing the first probabilities and the second probabilities.

2. The device of claim 1, wherein the display is configured to generate the virtual content so that the virtual keys appear to be projected into 3D space from a perspective of the user.

3. The device of claim 1, wherein the sensors are configured to detect parameters associated with the movement of the user extremity through the volumes and wherein the parameters are utilized by the processor to assign the first probabilities and the second higher probabilities.

4. The device of claim 3, wherein the parameters further include change in direction and change in velocity relative to individual volumes.

5. The device of claim 4, wherein the virtual content is associated with individual virtual keys associated with characters, and wherein the processor is configured to compare a sequence of characters associated with the movement to a dictionary of known words to predict the intended user action as spelling an individual word from the dictionary.

6. The device of claim 5, wherein the processor is configured to perform the intended user action.

7. The device of claim 6, wherein the processor is configured to perform the intended user action by auto-populating the individual word into a dialog box or providing the individual word as an auto-suggestion for the dialog box.

8. The device of claim 7, wherein the processor is configured to perform the auto-populating when a confidence associated with the individual word exceeds a threshold.

9. A device-implemented method, comprising:
generating a virtual keyboard with head mounted optics positioned in front of eyes of a user;
detecting a path of a user extremity in 3D space proximate to a perceived position of the virtual keyboard;
assigning probabilities to individual keys of the virtual keyboard when the path passes through a volume defined at least in part by the individual keys and extending toward and away from the user relative to the individual keys;
updating the probabilities relative to an individual key to a higher probability when the path relative to an individual key entails a dwell time of the user extremity above a threshold and includes directional changes including movement toward the user in the volume relative to the individual key and away from the user in the volume relative to the individual key;
predicting an intended user action based at least in part on the probabilities and the updated probabilities; and,
automatically taking an action on behalf of the user based at least in part upon the predicted intended user action.

10. The device-implemented method of claim 9, wherein detecting a path of a user extremity comprises detecting the path of a finger, multiple fingers, a hand, fingers of both a left and right hand, and/or an object held in the hand.

11. The device-implemented method of claim 9, wherein the updating comprises assigning highest probabilities to an individual key where the path through the individual key includes movement parallel to the individual key and either toward or away from the user in the volume relative to the individual key and the dwell time relative to the individual key compared to other individual keys.

12. The device-implemented method of claim 9, wherein assigning probabilities to individual keys of the virtual keyboard comprises assigning a first probability to an individual key of the keyboard when the path passes relative to the individual key under first parameters and assigning a second higher probability to another individual key when the path passes relative to the another individual key under second parameters.

13. The device-implemented method of claim 12, wherein taking an action comprises populating a dialog box with a word selected based at least in part upon the at least one of the first probability, the second higher probability, and/or the updated probabilities.

14. A device-implemented method, comprising:
generating virtual content with a device positioned on a head of a user, the virtual content including virtual keys and appearing to the user in a volume beyond the device;
defining virtual content volumes that extend both in front of and behind individual virtual keys relative to the user,
detecting finger movement of the user through individual virtual content volumes;
detecting parameter changes associated with detected finger movement through individual virtual content volumes, the parameter changes including changes in direction relative to a surface of an individual key and changes in velocity relative to the individual key; and,
building potential user selections of individual virtual keys from detected parameter changes at least in part by assigning probabilities based on the detected parameter changes.

15. The device-implemented method of claim 14, wherein generating virtual content comprises generating a virtual keyboard and the defining virtual content volumes are defined at least in part by eyes of the user and a periphery of individual virtual keys or wherein the virtual content volumes are defined as cuboids that extend both in front of and behind individual keys relative to the user.

16. The device-implemented method of claim 15, wherein detecting parameter changes further comprises detecting changes in direction of the finger movement both towards and away from an individual virtual key.

17. The device-implemented method of claim 16, wherein detecting parameter changes in direction comprises at least one of: detecting changes in direction parallel to a key surface and detecting changes in a direction perpendicular to the key surface.

18. The device-implemented method of claim 17, wherein the detecting parameter changes further comprises assigning higher probabilities to individual virtual keys in potential key sequences associated with dwell times of finger movement for individual virtual content volumes above a threshold.

19. The device-implemented method of claim 18, further comprising comparing the potential key sequences to known words.

20. The device-implemented method of claim 18, further comprising comparing the potential key sequences to known user commands.

* * * * *